United States Patent [19]
Ohkoshi et al.

[11] Patent Number: 5,050,396
[45] Date of Patent: Sep. 24, 1991

[54] MULTI-SYSTEM AIR CONDITIONING MACHINE

[75] Inventors: Seizi Ohkoshi; Eiji Kuwahara, both of Fuji, Japan

[73] Assignee: Kabushiki Kaisha Toshiba, Kawasaki, Japan

[21] Appl. No.: 483,819

[22] Filed: Feb. 23, 1990

[30] Foreign Application Priority Data

Feb. 27, 1989 [JP] Japan .................................. 1-45739
Feb. 27, 1989 [JP] Japan .................................. 1-45740

[51] Int. Cl.⁵ ............................................ F25B 13/00
[52] U.S. Cl. ................................ 62/160; 62/181; 237/2 B
[58] Field of Search ............... 62/160, 324.6, 324.1, 62/181; 237/2 B

[56] References Cited

U.S. PATENT DOCUMENTS 4,862,705 9/1989 Nakamurad et al. .......... 62/324.6 X
4,878,357 11/1989 Sekigami et al. ..................... 62/160

FOREIGN PATENT DOCUMENTS 61-45145 10/1986 Japan .

Primary Examiner—William E. Wayner
Attorney, Agent, or Firm—Cushman, Darby & Cushman

[57] ABSTRACT

A total cooling capability requested from one or a plurality of indoor units is compared with a total heating capability requested from one or the plurality of indoor units to set a cooling or heating operation mode.

11 Claims, 23 Drawing Sheets

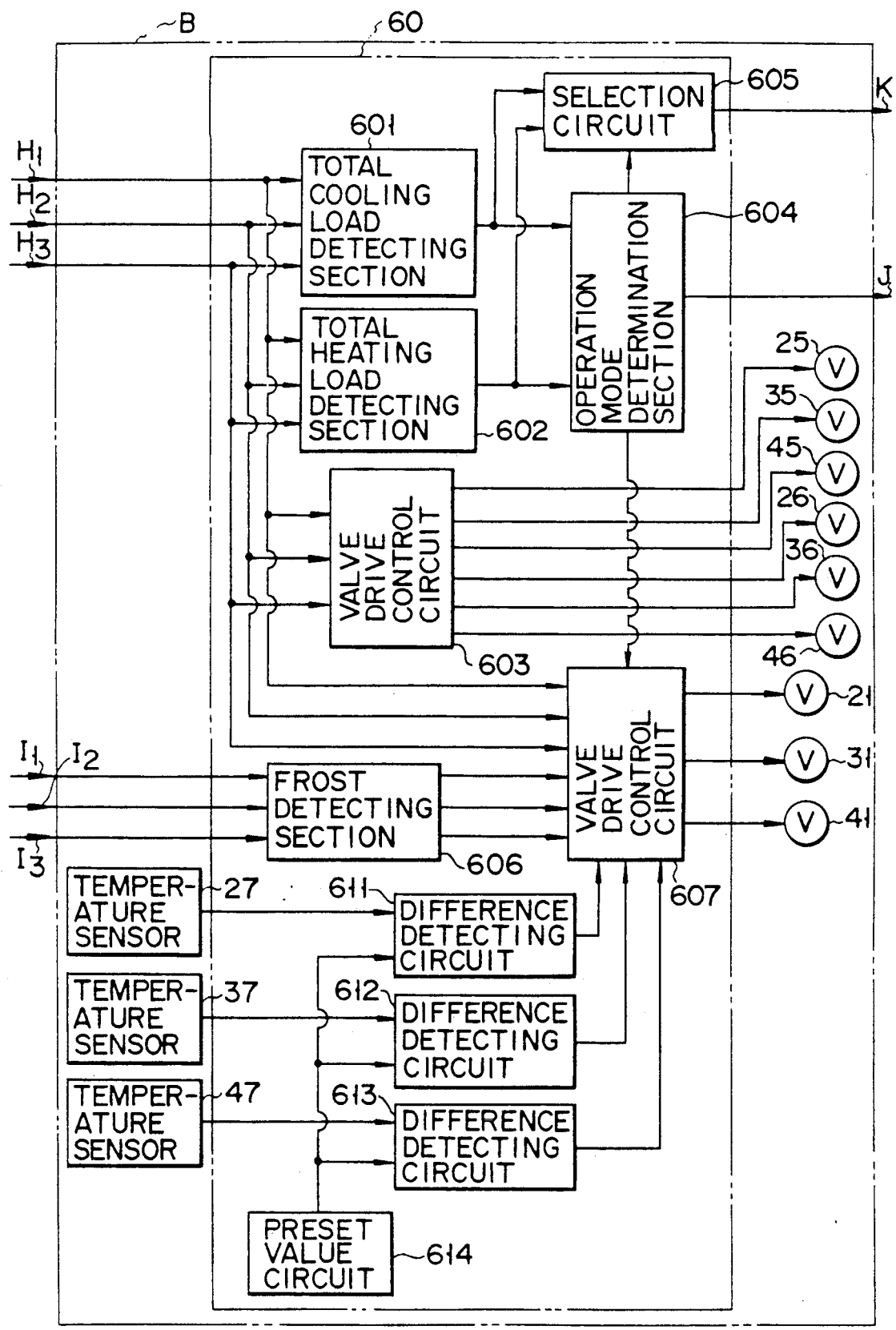
F I G. 3

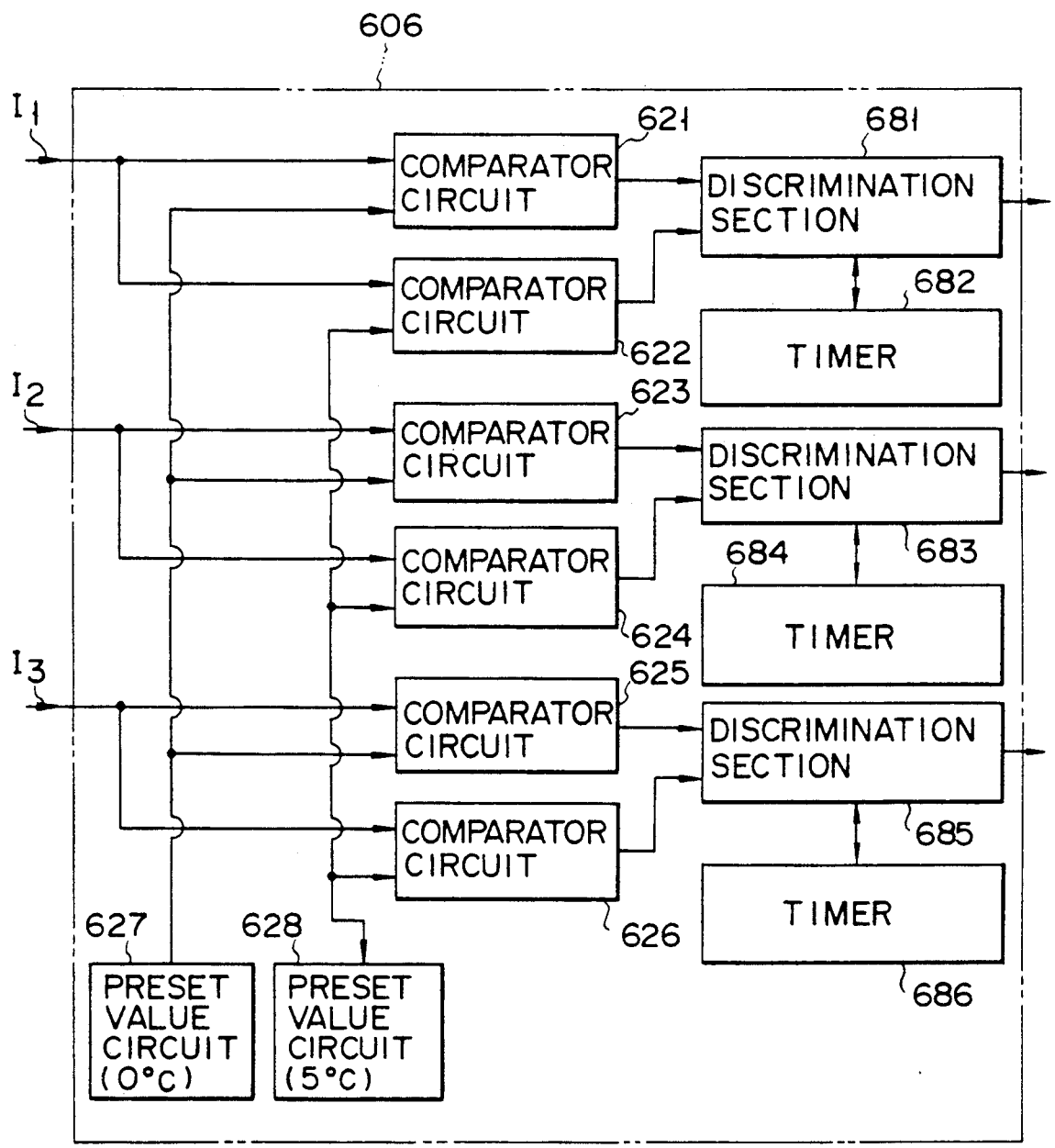
F I G. 4

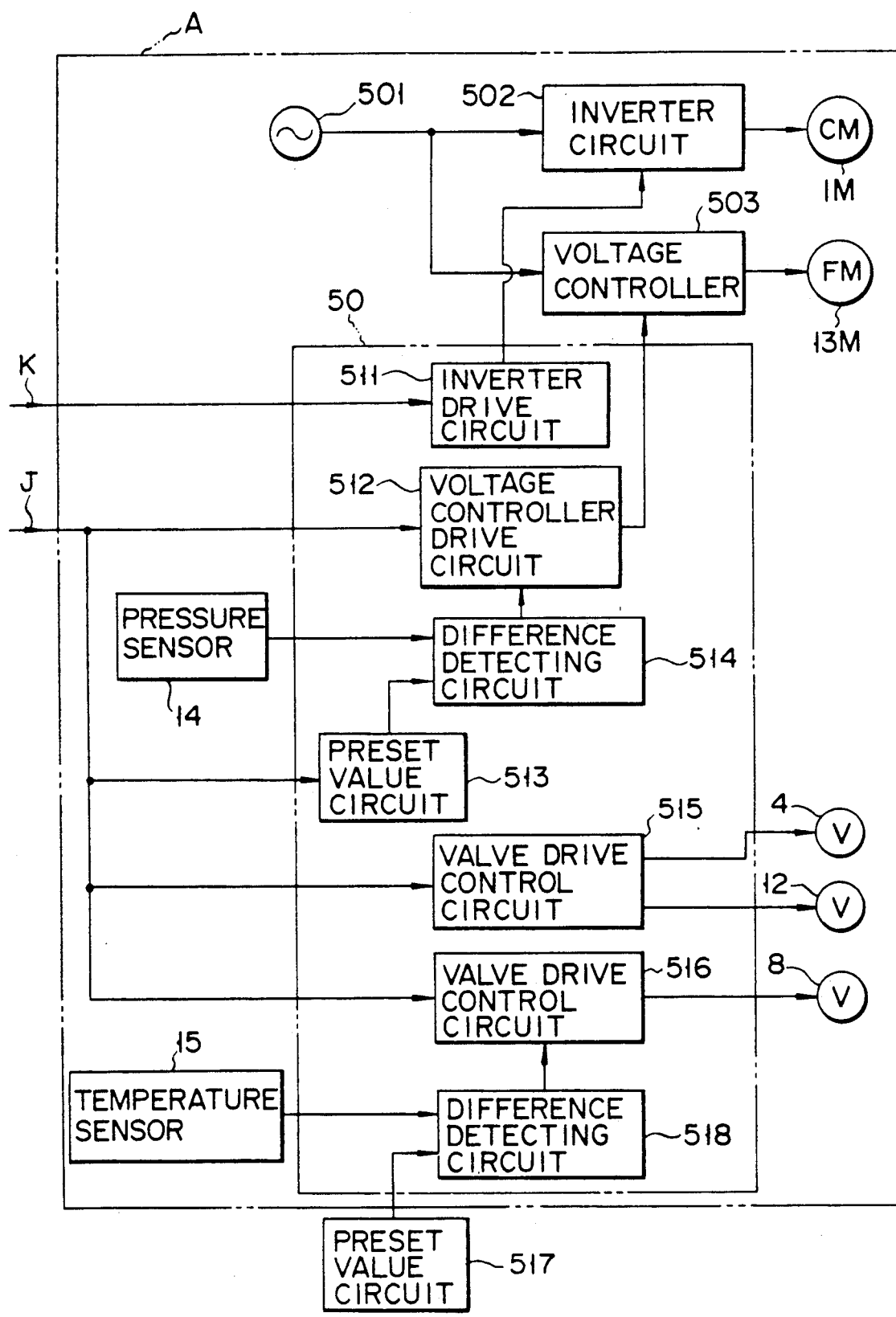
F I G. 5

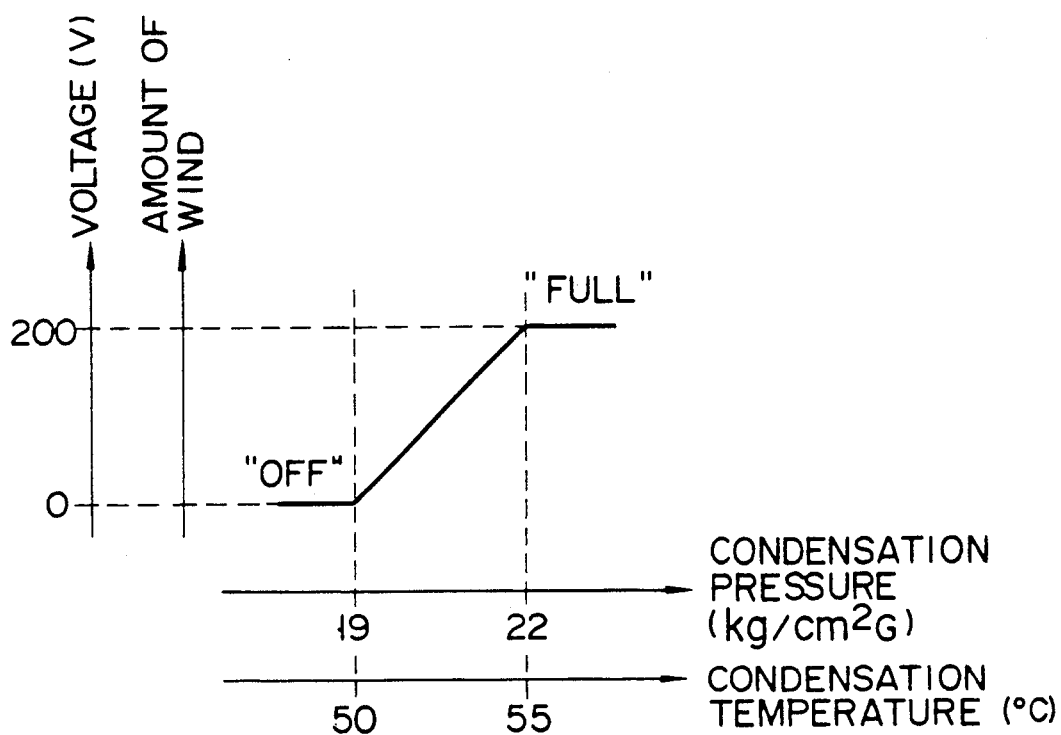
F I G. 7
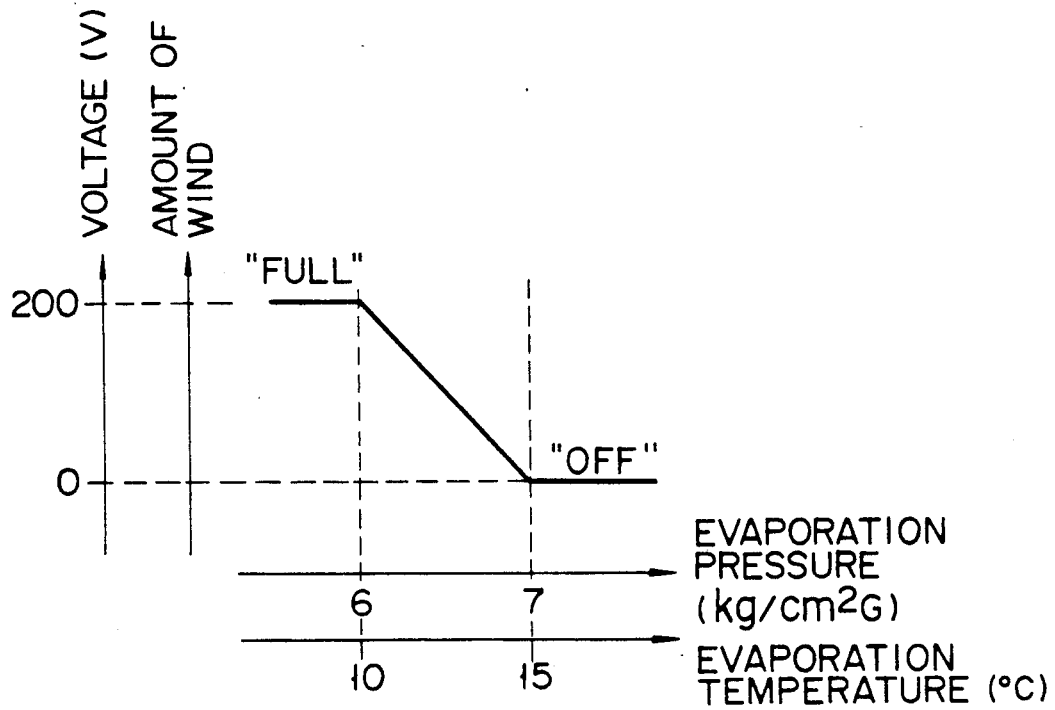
F I G. 9

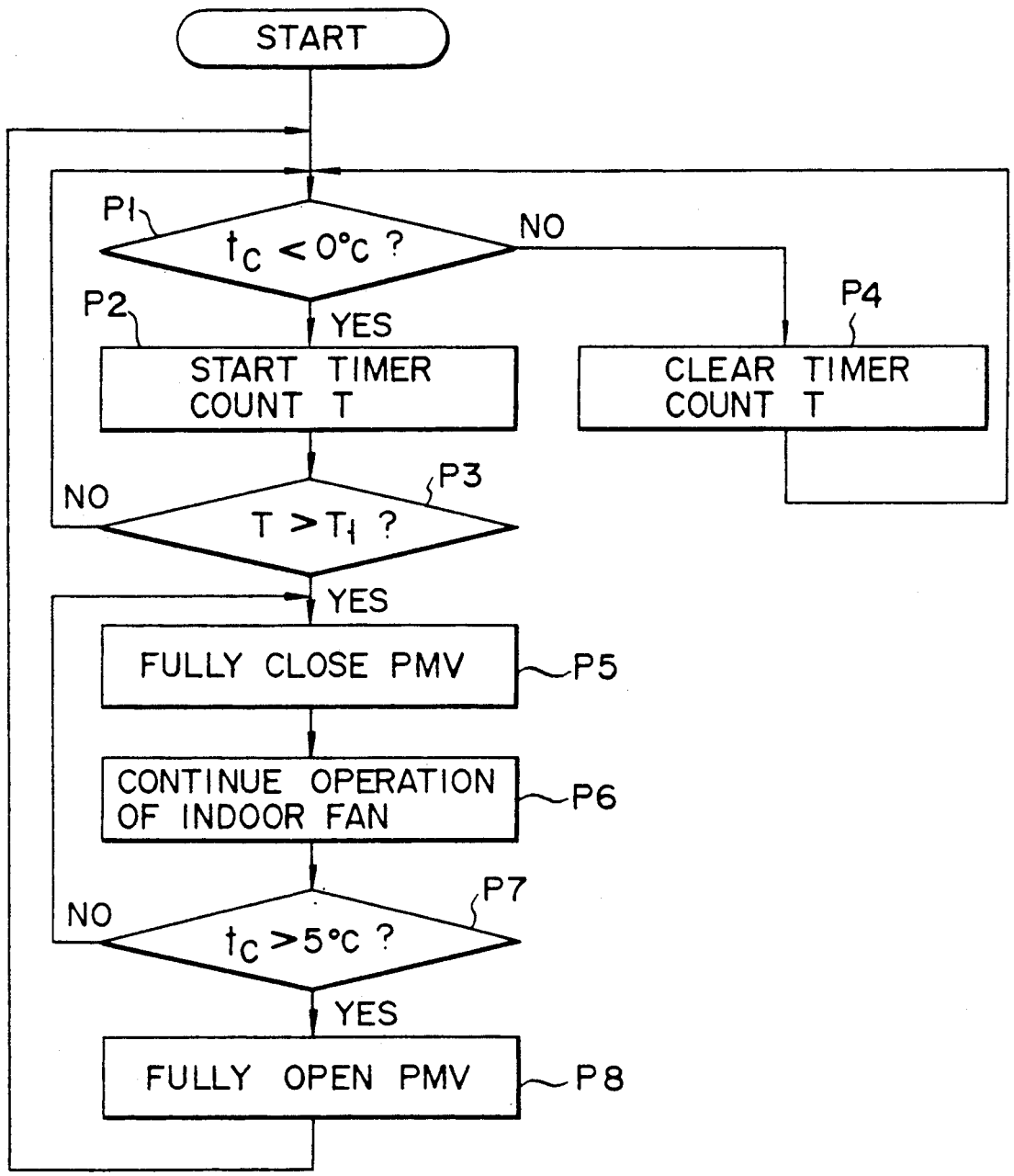
F I G. 10

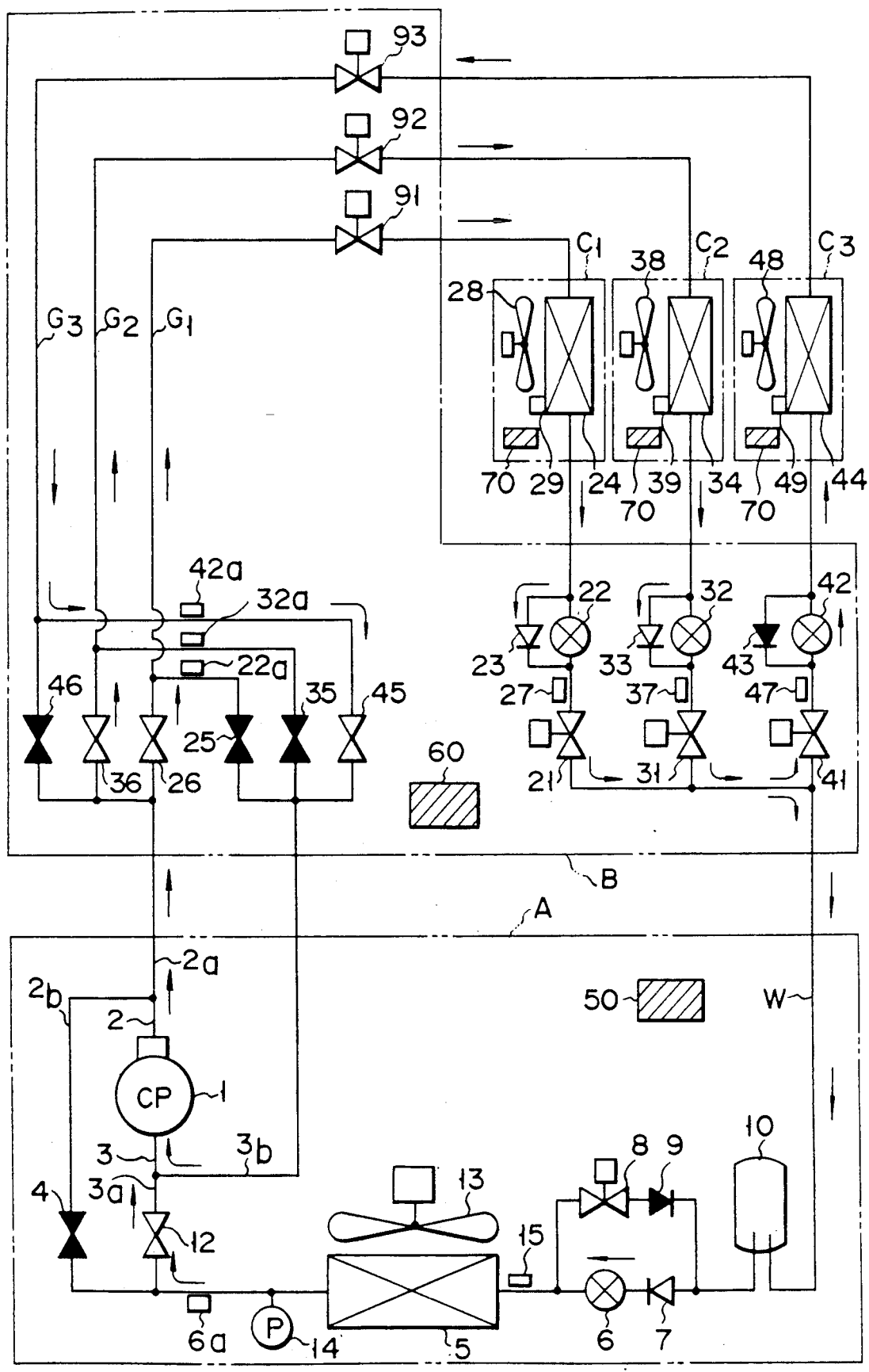
F I G. 12

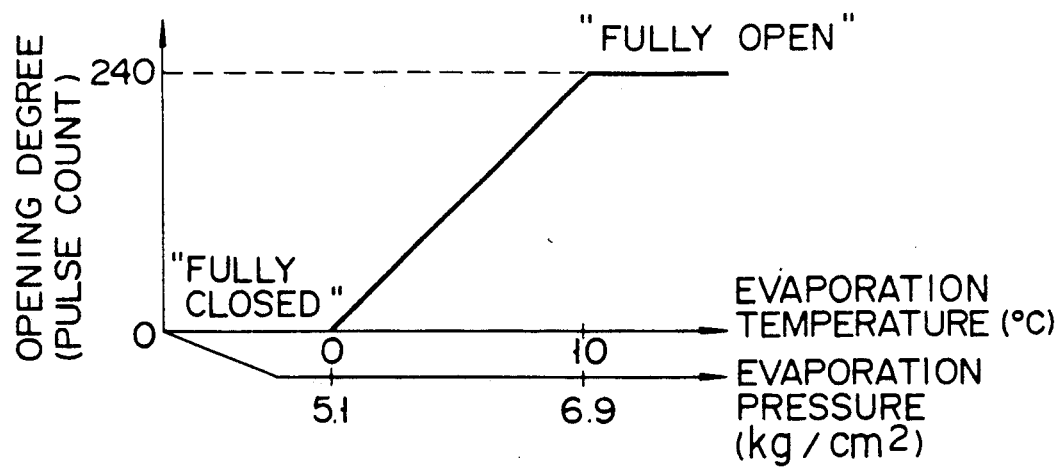
F I G. 16
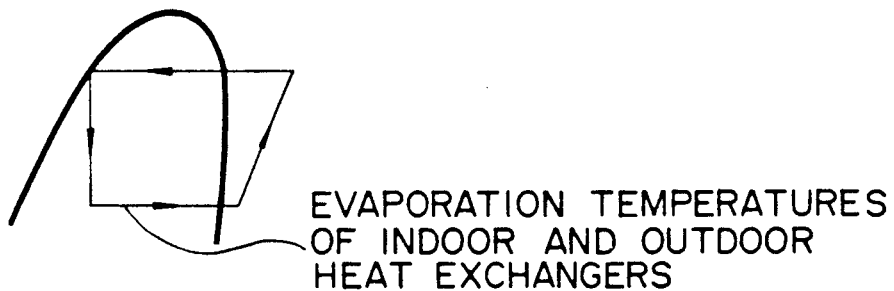
F I G. 17
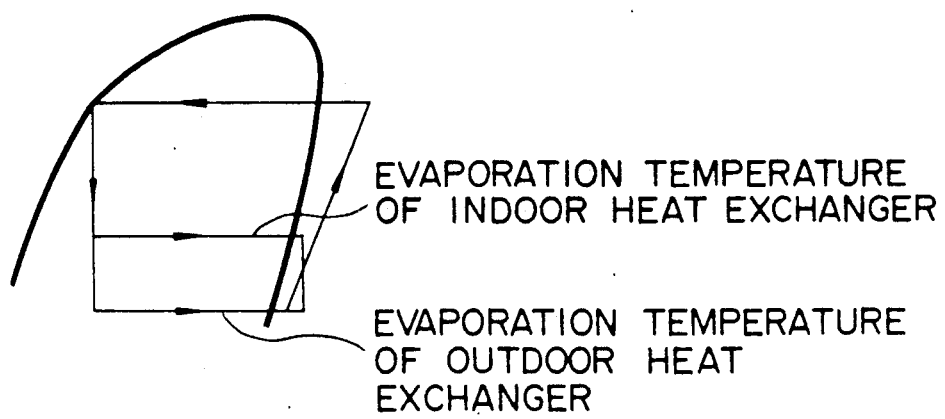
F I G. 18

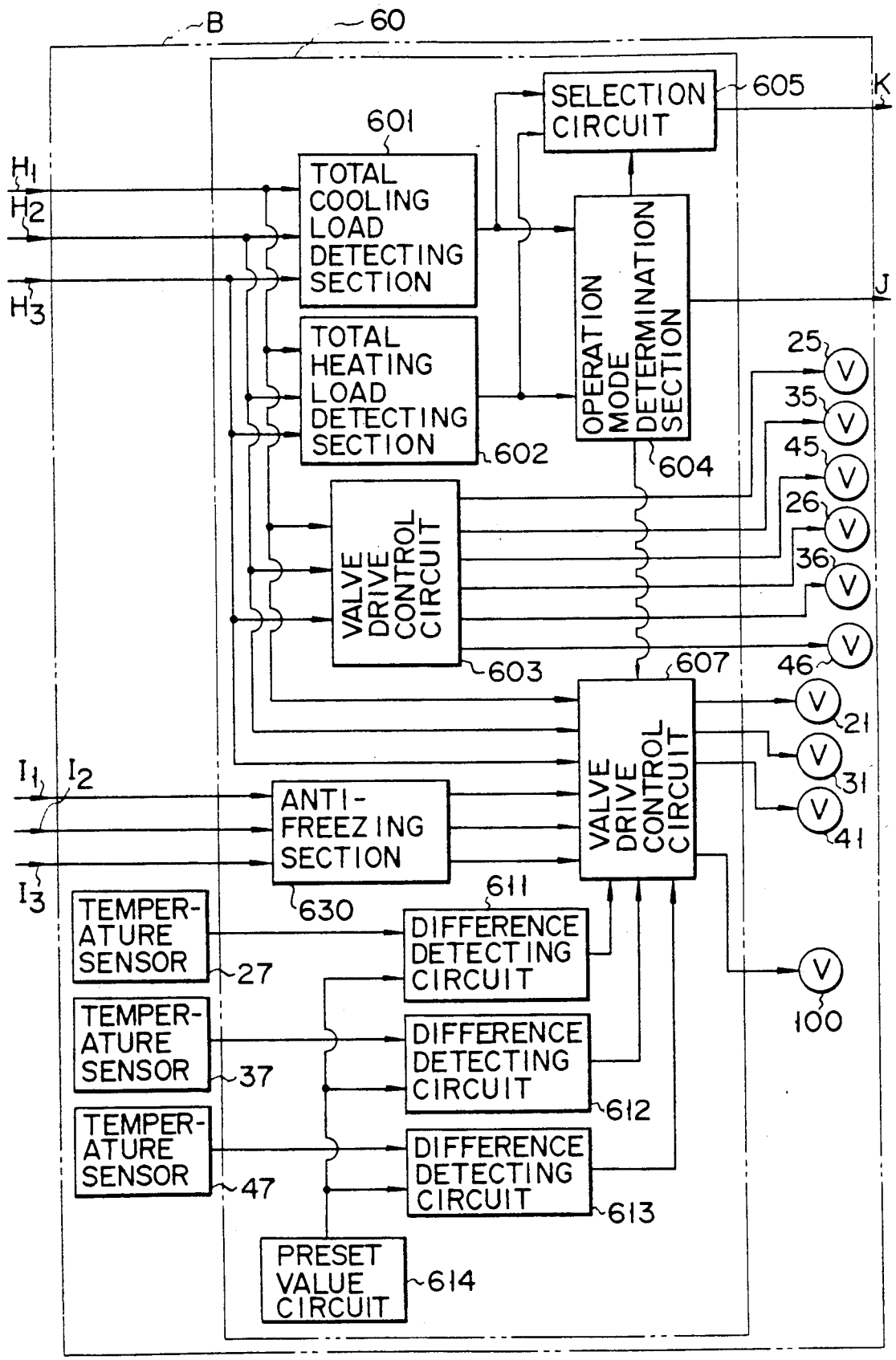
F I G. 20

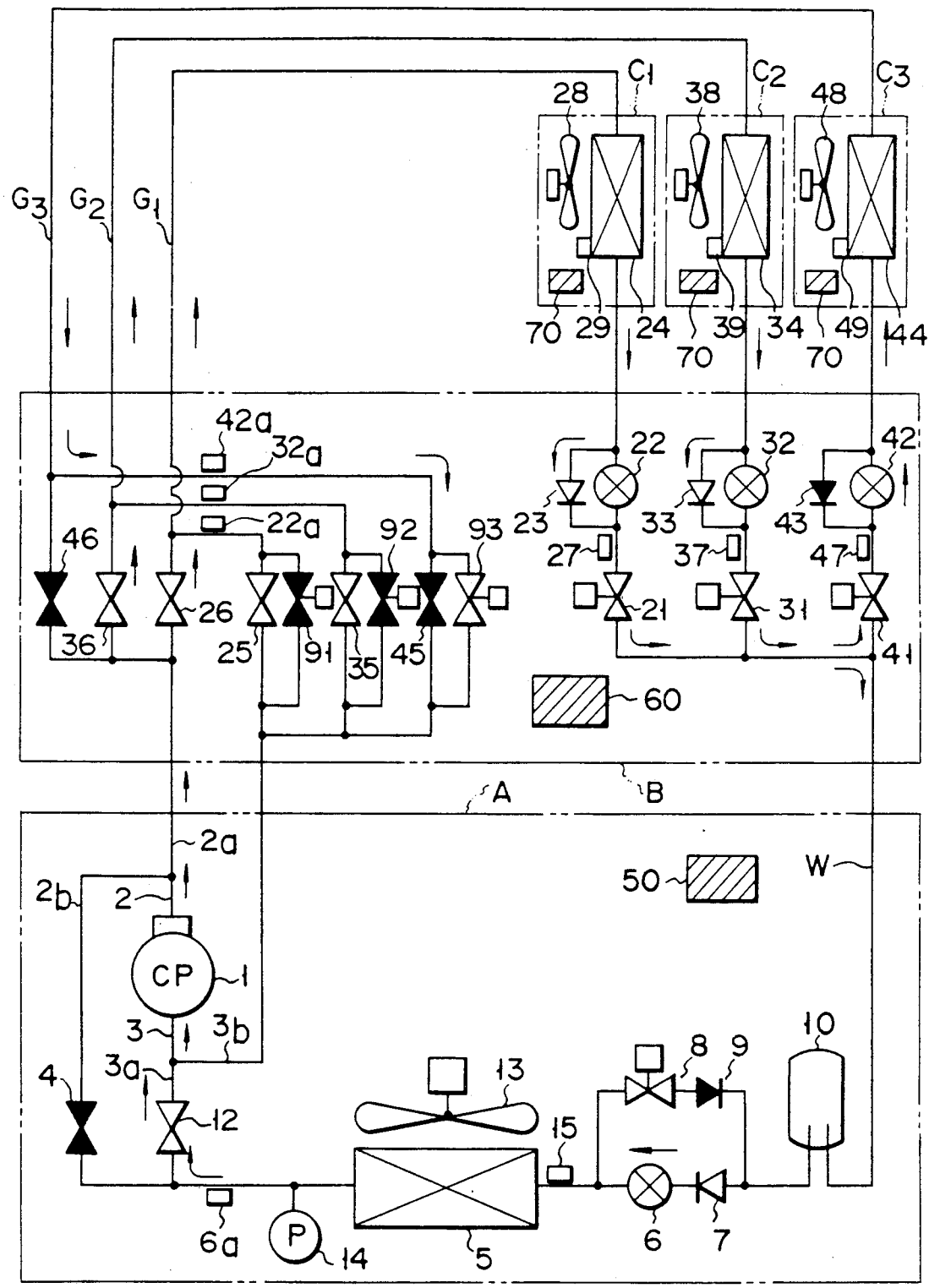
F I G. 21

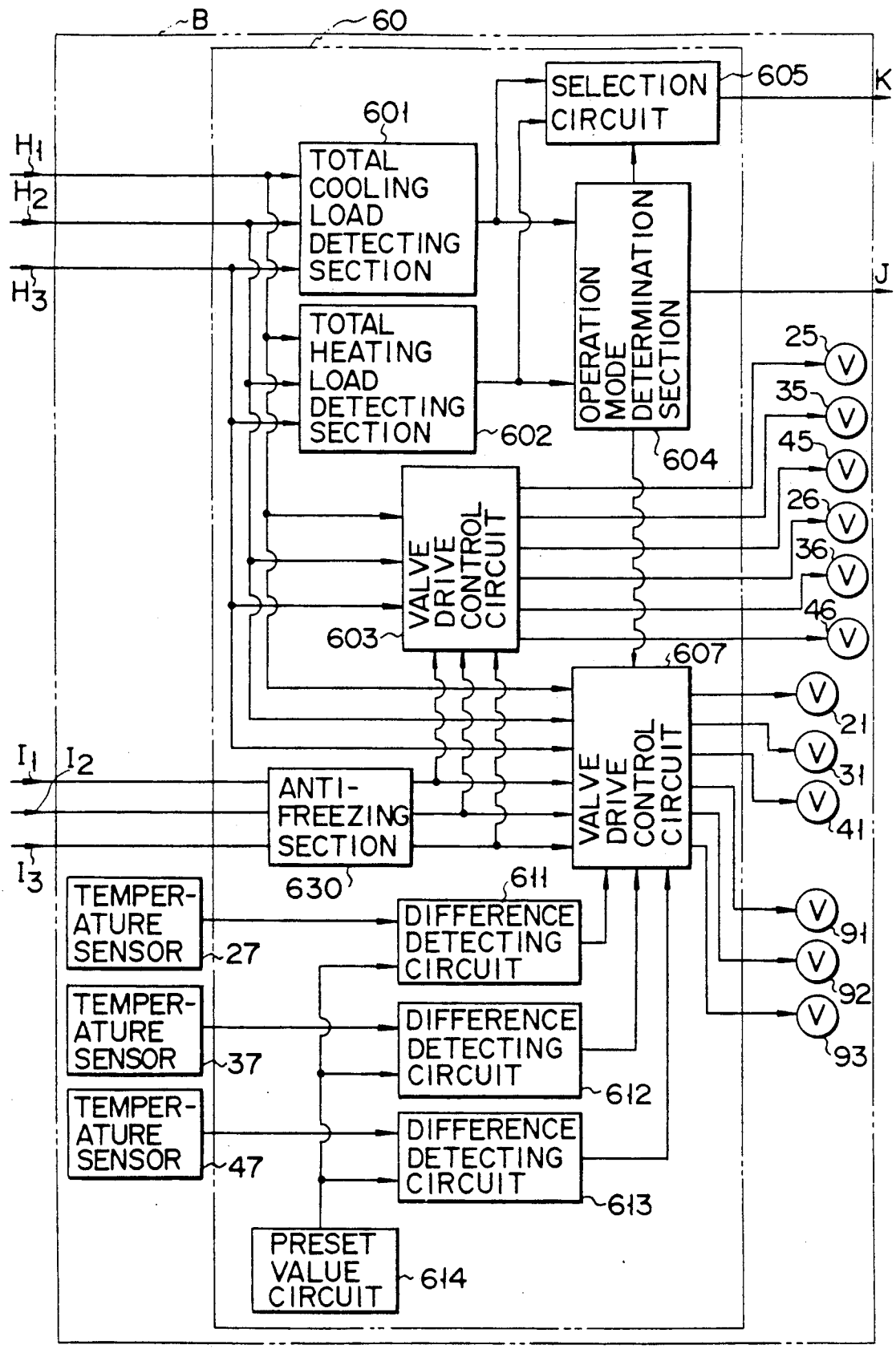
F I G. 22

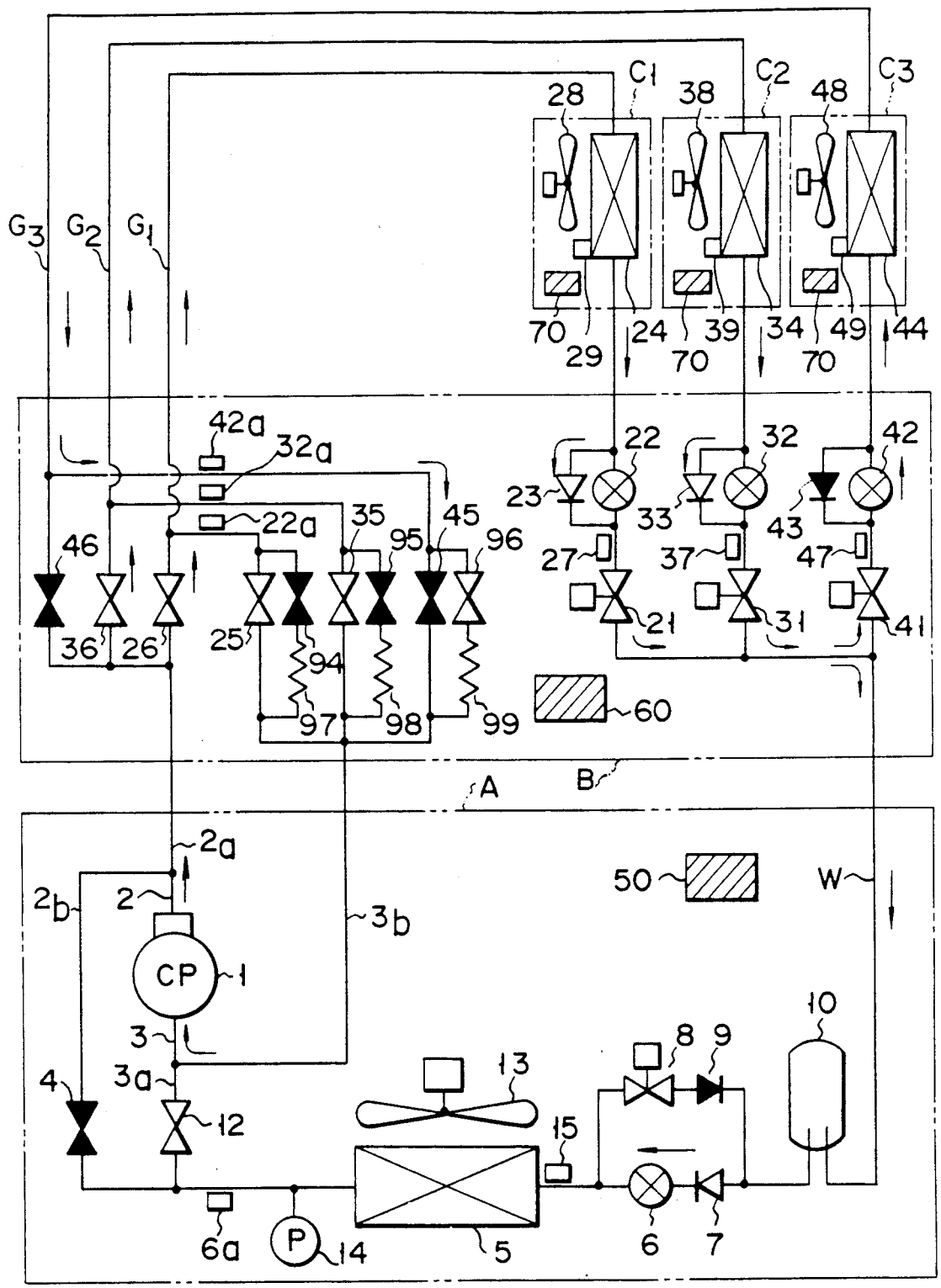
F I G. 24

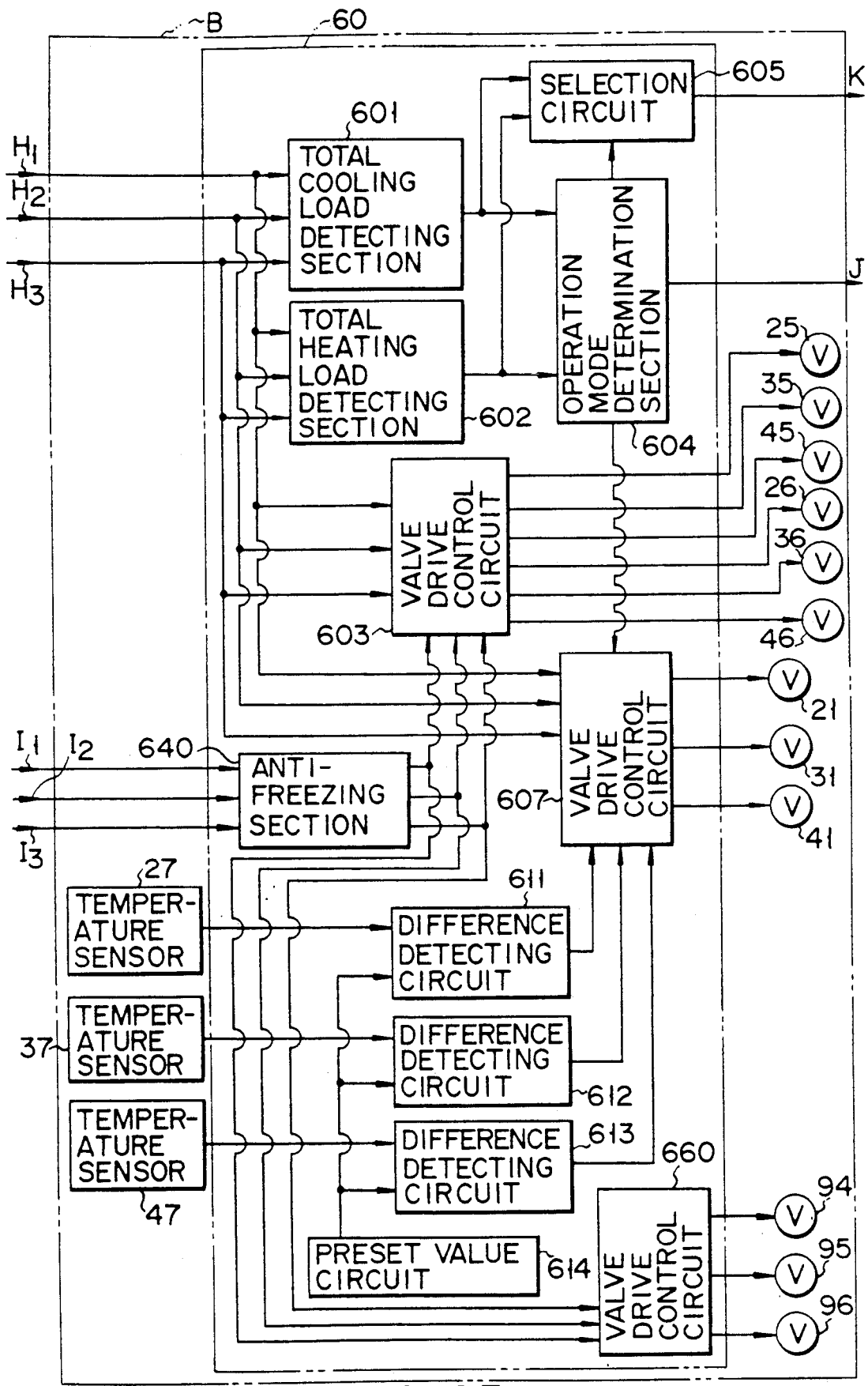
F I G. 25

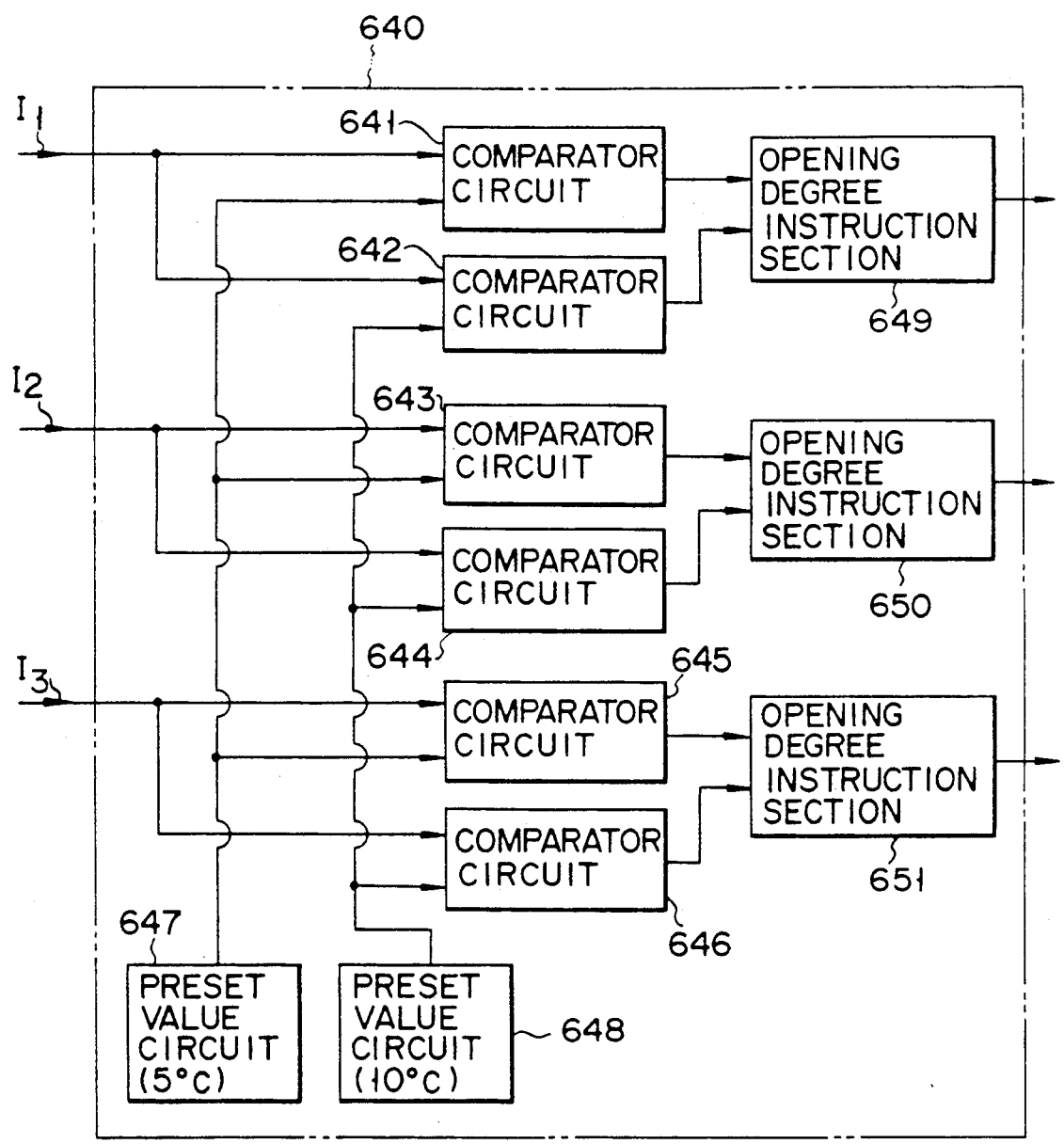
F I G. 26

MULTI-SYSTEM AIR CONDITIONING MACHINE

BACKGROUND OF THE INVENTION

1. Field of the Invention

The present invention relates to a multi-system air conditioning machine of a multi type including a plurality of indoor units.

2. Description of the Related Art

A multi-system air conditioning machine of a multi type including one outdoor unit and a plurality of indoor units to constitute a heat-pump refrigerating apparatus between these units is conventionally known.

This multi-system air conditioning machine is convenient because a plurality of rooms in a building can be simultaneously cooled or heated.

In a building including a computer room or a perimeter or interior zone, however, when a request for a cooling operation is raised from one place, a request for a heating operation may often be raised from another place at the same time.

In this case, a cooling or heating operation must be preferentially performed.

For this reason, even if a good environment can be obtained in one place, a resident may feel uncomfortable in another place, or an equipment such as a computer may often be adversely affected.

The above disadvantages easily occur not only in a building but also in a normal house having a plurality of rooms during an intermediate season such as spring or fall.

On the other hand, an air conditioning machine which can execute a heating operation of at least one indoor unit while at least one of a plurality of indoor units performs a cooling operation is disclosed in Published Examined Japanese Patent Application No. 61-45145.

This application, however, describes only the basic flow of a refrigerant required to simultaneously execute cooling and heating operations in a plurality of indoor units, and does not describe switching of operation modes and setting of a capability in accordance with each request of the plurality of indoor units at all.

SUMMARY OF THE INVENTION

It is an object of the present invention to provide a multi-system air conditioning machine which can simultaneously execute cooling and heating operations in a plurality of indoor units, can automatically switch operation modes of each indoor unit in accordance with a request of the indoor unit, and can automatically set a capability of each indoor unit in an appropriate state in accordance with a request of each indoor unit.

According to the present invention, there is provided an air conditioning machine comprising:

an outdoor unit including a compressor for drawing, compressing, and delivering a refrigerant, and an outdoor heat exchanger for exchanging heat of the supplied refrigerant and heat of outer air;

a plurality of indoor units each including an indoor heat exchanger for exchanging the heat of the supplied refrigerant and heat of inner air, for requesting a cooling operation mode and a cooling capability or a heating operation mode and a heating capability;

means for supplying the refrigerant delivered from the compressor to the outdoor heat exchanger, supplying the refrigerant to one or the plurality of indoor units which request a cooling operation mode, and returning the refrigerant to the compressor when a total cooling capability requested from one or the plurality of indoor units is larger than a total heating capability requested from the remaining one or plurality of indoor units;

means for supplying a part of the refrigerant delivered from the compressor to one or the plurality of indoor units which request a heating Operation mode to cause the part of refrigerant to join the flow of the refrigerant to one or the plurality of the indoor units which request a cooling operation mode, when a total cooling capability requested from one or the plurality of indoor units is larger than a total heating capability requested from the remaining one or the plurality of indoor units;

means for supplying the refrigerant delivered from the compressor to one or the plurality of indoor units which request a heating operation mode, supplying the refrigerant to the outdoor heat exchanger, and returning the refrigerant to the compressor, when a total heating capability requested from one or the plurality of indoor units is larger than a total cooling capability requested from the remaining one or plurality of indoor units; and means for supplying a part of the refrigerant supplied from one or the plurality of indoor units which request a heating operation mode to one or the plurality of indoor units which request a cooling operation mode, and returning the refrigerant to the compressor, when a total heating capability requested from one or the plurality of indoor units is larger than a total cooling capability requested from the remaining one or plurality of indoor units.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a block diagram showing a multi-control section and its peripheral sections of the multi-system air conditioning machine according to the first embodiment;

FIG. 4 is a block diagram showing a detailed arrangement of a frost detecting section in the multi-control section of the multi-system air conditioning machine according to the first embodiment;

FIG. 5 is a block diagram showing an outdoor control section and its peripheral sections of the multi-system air conditioning machine according to the first embodiment;

FIG. 7 is a graph for explaining outdoor fan control in the cooling operation mode of the multi-system air conditioning machine according to the first embodiment;

FIG. 9 is a graph for explaining outdoor fan control in the heating operation mode of the multi-system air conditioning machine according to the first embodiment;

FIG. 10 is a flow chart for explaining defrosting control of the multi-system air conditioning machine according to the first embodiment;

FIG. 12 is a diagram showing an entire arrangement of a multi-system air conditioning machine according to the third embodiment of the present invention;

FIG. 16 is a graph for explaining a change in opening degree of a PMV in the third embodiment;

FIG. 17 is a Mollier diagram showing a state of a cooling apparatus in the third embodiment;

FIG. 18 is a Mollier diagram showing a state of the cooling apparatus in the third embodiment;

FIG. 20 is a block diagram showing a multi-control section and its peripheral sections of the multi-system air conditioning machine according to the fourth embodiment;

FIG. 21 is a diagram showing an entire arrangement of a multi-system air conditioning machine according to the fifth embodiment of the present invention;

FIG. 22 is a block diagram showing a multi-control section and its peripheral sections of the multi-system air conditioning machine according to the fifth embodiment;

FIG. 24 is a diagram showing an entire arrangement of a multi-system air conditioning machine according to the sixth embodiment of the present invention;

FIG. 25 is a block diagram showing a multi-control section and its peripheral sections of the multi-system air conditioning machine according to the sixth embodiment;

FIG. 26 is a block diagram showing a detailed arrangement of an antifreezing section in the multi-control section of the multi-system air conditioning machine according to the sixth embodiment;

DETAILED DESCRIPTION OF THE PREFERRED EMBODIMENTS

The first embodiment of the present invention will be described hereinafter with reference to the accompanying drawings.

Figure 1:
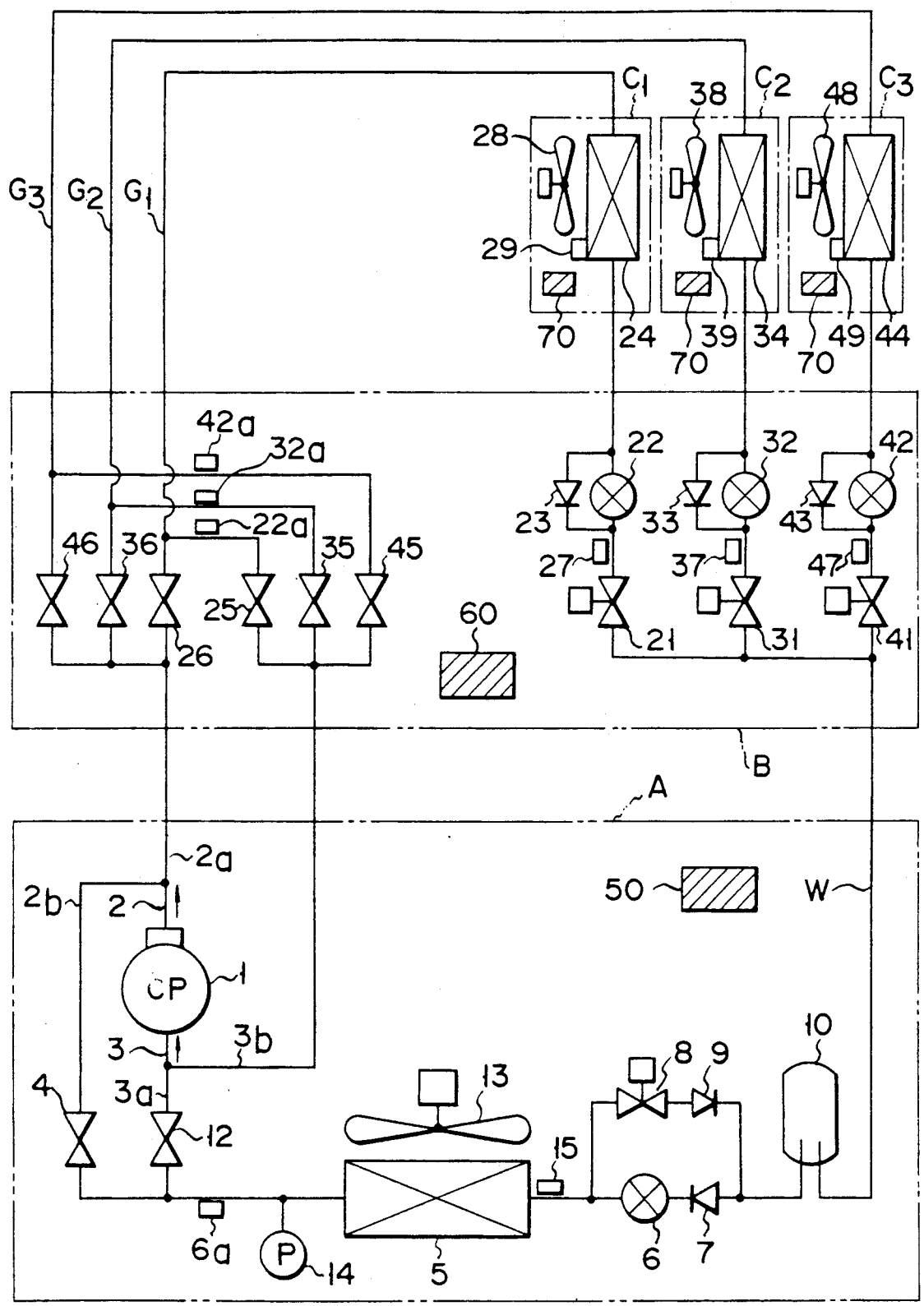
FIG. 1 is a diagram showing an entire arrangement of a multi-system air conditioning machine according to the first embodiment of the present invention.

Referring to FIG. 1, reference symbol A denotes an outdoor unit. A plurality of indoor units $C_1$, $C_2$, and $C_3$ are connected to the outdoor unit A through a switching unit B.

These outdoor unit A, switching unit B, and indoor units $C_1$, $C_2$, and $C_3$ constitute the following refrigerating apparatus.

The outdoor unit A includes a variable-capability compressor 1. The compressor 1 draws a refrigerant through a refrigerant intake port, compresses the refrigerant, and delivers the compressed refrigerant through a refrigerant outlet port.

An outlet pipe 2 is connected to the refrigerant outlet port of the compressor 1.

An intake pipe 3 is connected to the refrigerant intake port of the compressor 1.

The outlet pipe 2 is branched into two outlet pipes 2a and 2b.

The intake pipe 3 is branched into two intake pipes 3a and 3b.

An outdoor heat exchanger 5 is connected to the outlet pipe 2b through a two-way valve 4. The outdoor heat exchanger 5 exchanges heat of the supplied refrigerant and heat of outer air.

A liquid tank 10 is connected to the outdoor heat exchanger 5 through a series circuit consisting of a heating expansion valve 6 and a check valve 7, and a series circuit consisting of a cooling PMV (pulse motor valve) 8 and a check valve 9. A liquid-side pipe W is connected to the liquid tank 10.

The intake pipe 3a is connected to a refrigerant pipe between the two-way valve 4 and the outdoor heat exchanger 5 through a two-way valve 12.

Cooling expansion valves 22, 32, and 42 are connected to the liquid-side pipes W through PMVs 21, 31, and 41 in the switching unit B, respectively. Check valves 23, 33, and 43 are connected in parallel to the expansion valves 22, 32, and 42, respectively.

Indoor heat exchangers 24, 34, and 44 of the indoor units $C_1$, $C_2$, and $C_3$ are connected to the expansion valves 22, 32, and 42, respectively. These indoor heat exchangers 24, 34, and 44 exchange heat of the supplied refrigerant and heat of inner air.

Gas-side pipes $G_1$, $G_2$, and $G_3$ are connected to the indoor heat exchangers 24, 34, and 44, respectively.

Each of the gas-side pipes $G_1$, $G_2$, and $G_3$ is branched into two pipes.

One branch pipe of each of the gas-side pipes $G_1$, $G_2$, and $G_3$ is connected to the inlet pipe 3b through the corresponding one of two-way valves 25, 35, and 45 in the switching unit B.

The other branch pipe of each of the gas-side pipes $G_1$, $G_2$, and $G_3$ is connected to the outlet pipe 2a through the corresponding one of two-way valves 26, 36, and 46 in the switching unit B.

Note that the outdoor unit A also includes an outdoor fan 13 for circulating the outer air in the outdoor heat exchanger 5.

A pressure sensor 14 is attached to the refrigerant pipe between the two-way valves 4 and 12 and the outdoor heat exchanger 5. The pressure sensor 14 serves as the second detecting means for detecting a pressure of the refrigerant in the outdoor heat exchanger 5.

A temperature sensor 15 is attached to a refrigerant pipe between the outdoor heat exchanger 5 and the valves 6 and 8.

A heat-sensitive section 6a is attached to the refrigerant pipe between the two-way valves 4 and 12 and the outdoor heat exchanger 5.

The heat-sensitive section 6a is a part attached to the heating expansion valve 6.

The heating expansion valve 6 includes the first detecting means for detecting a difference between a temperature sensed by the heat-sensitive section 6a and a temperature of the refrigerant supplied to the valve 6, i.e., a degree of superheat of the refrigerant in the outdoor heat exchanger 5. The heating expansion valve 6 includes the regulating means for regulating an amount of the refrigerant supplied to the outdoor heat exchanger 5 to set the detected degree of superheat to be constant.

In the switching unit B, temperature sensors 27, 37, and 47 are attached to refrigerant pipes between the PMVs 21, 31, and 41 and the check valves 23, 33, and 43, respectively.

Heat-sensitive sections 22a, 32a, and 42a are respectively attached to corresponding ones (on the side of two-way valves 25, 35, and 45) of the branch pipes of the gas-side pipes $G_1$, $G_2$, and $G_3$. The heat-sensitive sections 22a, 32a, and 42a are parts respectively attached to the cooling expansion valves 22, 32, and 42.

The expansion valves 22, 32, and 42 respectively include the detecting means for detecting differences between temperatures sensed by the heat-sensitive sections 22a, 32a, and 42a and temperatures of the refrigerant in the valves 22, 32, and 42, i.e., a degree of superheat of the refrigerant supplied to the indoor heat exchangers 24, 34, and 44. The expansion valves 22, 32, and 42 respectively include the regulating means for regulating an amount of the refrigerant supplied to the indoor heat exchangers 24, 34, and 44 to set the detected degree of superheat to be constant.

In the indoor units $C_1$, $C_2$, and $C_3$ include an indoor fans 28, 38, and 48 for circulating the inner air in the indoor heat exchangers 24, 34, and 44, respectively.

Temperature sensors 29, 39, and 49 are attached to the indoor heat exchangers 24, 34, and 44, respectively.

On the other hand, the indoor unit A includes an outdoor control section 50.

The outdoor control section 50 controls the inverter for driving the compressor, the two-way valve 4, the PMV 8, the two-way valve 12, and the outdoor fan 13.

The switching unit B includes a multi-control section 60.

The multi-control section 60 controls the PMVs 21, 31, and 41 and the two-way valves 25, 35, 45, 26, 36, and 46.

The indoor units $C_1$, $C_2$, and $C_3$ include indoor control sections 70, respectively.

Each indoor control section 70 transfers a request for a cooling operation mode and a cooling capability, or a request for a heating operation mode and a heating capability, to the multi-control section 60, and to respectively control the indoor fans 28, 38, and 48.

The outdoor control section 50, the multi-control section 60 and the two-way valves constitute the following means (1) to (4):

(1) a means for supplying the refrigerant delivered from the compressor 1 to the outdoor heat exchanger 5, supplying the refrigerant to one or the plurality of indoor units which request a cooling operation mode, and returning the refrigerant to the compressor 1 when a total cooling capability requested from one or the plurality of indoor units is larger than a total heating capability requested from the remaining one or the plurality of indoor units;

(2) a means for supplying a part of the refrigerant delivered from the compressor 1 to one or the plurality of indoor units which request a heating operation mode to cause the part of refrigerant to join the flow of the refrigerant to one or the plurality of indoor units which request a cooling operation mode, when a total cooling capability requested from one or the plurality of indoor units is larger than a total heating capability requested from the remaining one or the plurality of indoor units;

(3) a means for supplying the refrigerant delivered from the compressor 1 to one or the plurality of indoor units which request a heating operation mode, supplying the refrigerant to the outdoor heat exchanger 5, and returning the refrigerant to the compressor 1, when a total heating capability requested from one or the plurality of indoor units is larger than a total cooling capability requested from the remaining one or the plurality of indoor units; and (4) a means for supplying a part of the refrigerant supplied from one or the plurality of indoor units which request a heating operation mode to one or the plurality of indoor units which request a cooling operation mode, and returning the refrigerant to the compressor 1, when a total heating capability requested from one or the plurality of indoor units is larger than a total cooling capability requested from the remaining one or the plurality of indoor units.

In addition, the outdoor control section 50 and the temperature sensor 15 constitute the first detecting means for detecting a degree of supercool of the refrigerant in the outdoor heat exchanger 5.

The outdoor control section 50 and the PMV 8 constitute the regulating means for regulating an amount of refrigerant supplied to the outdoor heat exchanger 5 to set the degree of supercool detected by the first detecting means to be constant.

The outdoor control section 50 constitutes the controlling means for controlling a speed of the outdoor fan 13 to set a detection result of the pressure sensor 14 serving as the second detecting means to be constant.

Each indoor control section 70, the multi-control section 60, and the PMVs 21, 31, and 41 constitute the limiting means for limiting the flow of the refrigerant into the indoor unit corresponding to the temperature sensor 29, 39, or 49 which detects a temperature below a predetermined value.

Figure 2:
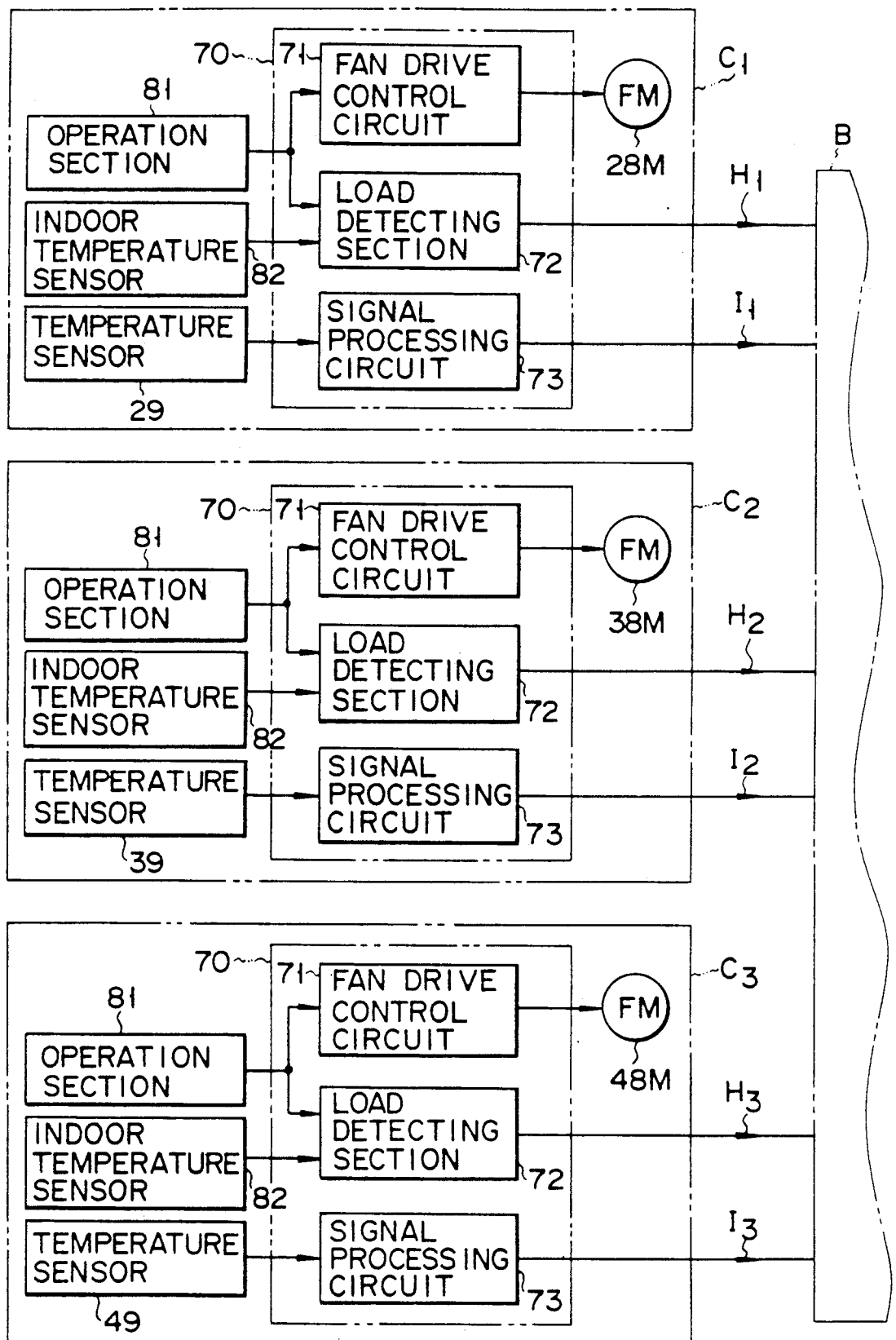
FIG. 2 is a block diagram showing indoor control sections and their peripheral sections of the multi-system air conditioning machine according to the first embodiment.

A detailed arrangement of each indoor control section 70 and its peripheral sections is shown in FIG. 2.

Each indoor control section 70 includes a fan drive control circuit 71, a load detecting section 72, and a signal processing circuit 73.

The fan drive control circuit 71 in the indoor unit $C_1$ controls a motor 28M for the indoor fan 28 in accordance with an operation of an operation section 81.

The fan drive control circuit 71 in the indoor unit $C_2$ controls a motor 38M for the indoor fan 38 in accordance with an operation of the operation section 81.

The fan drive control circuit 71 in the indoor unit $C_3$ controls a motor 48M for the indoor fan 48 in accordance with an operation of the operation section 81.

The load detecting section 72 in the indoor unit $C_1$ has the following functions (1) to (3):

(1) a function of requesting an operation mode set by the operation section 81, to the multi-control section 60 by supplying a signal Hl thereto;

(2) a function of detecting a difference between a room temperature set by the operation section 81 and a temperature sensed by a room temperature sensor 82, i.e., a load; and (3) a function of requesting a cooling or heating capability, which corresponds to the detected load, to the multi-control section 60 by supplying the signal Hl thereto.

The load detecting section 72 in the indoor unit $C_2$ has the following functions (1) to (3):

(1) a function of requesting an operation mode set by the operation section 81, to the multi-control section 60 by supplying a signal $H_2$ thereto;

(2) a function of detecting a difference between a room temperature set by the operation section 81 and a temperature sensed by the room temperature sensor 82, i.e., a load; and (3) a function of requesting a cooling or heating capability, which corresponds to the detected load, to the multi-control section 60 by supplying the signal $H_2$ thereto.

The load detecting section 72 in the indoor unit $C_3$ has the following functions (1) to (3):

(1) a function of requesting an operation mode set by the operation section 81, to the multi-control section 60 by supplying a signal $H_3$ thereto;

(2) a function of detecting a difference between a room temperature set by the operation section 81 and a temperature sensed by the room temperature sensor 82, i.e., a load; and (3) a function of requesting a cooling or heating capability, which corresponds to the detected load, to the multi-control section 60 by supplying the signal $H_3$ thereto.

The signal processing circuit 73 in the indoor unit $C_1$ converts a temperature of the indoor heat exchanger 24 sensed by the temperature sensor 29 into a signal $I_1$ to supply the signal $I_1$ to the multi-control section 60.

The signal processing circuit 73 in the indoor unit $C_2$ converts a temperature of the indoor heat exchanger 34 sensed by the temperature sensor 39 into a signal $I_2$ to supply the signal $I_2$ to the multi-control section 60.

The signal processing circuit 73 in the indoor unit $C_3$ converts a temperature of the indoor heat exchanger 44 sensed by the temperature sensor 49 into a signal $I_3$ to supply the signal $I_3$ to the multi-control section 60.

A detailed arrangement of the multi-control section 60 and its peripheral circuits is shown in FIG. 3.

The multi-control section 60 includes a total cooling load detecting section 601, a total heating load detecting section 602, a valve drive control circuit 603, an operation mode determination section 604, a selection circuit 605, a frost detecting section 606, a valve drive control circuit 607, difference detecting circuits 611, 612, and 613, and a present value circuit 614.

The total cooling load detecting section 601 has the following functions (1) and (2):

(1) a function of discriminating a request for a cooling capability on the basis of the signals $H_1$, $H_2$, and $H_3$ from the indoor sections 70; and (2) a function of detecting the discriminated total cooling capability.

The total heating load detecting section 602 has the following functions (1) and (2):

(1) a function of discriminating a request for a heating capability on the basis of the signals $H_1$, $H_2$, and $H_3$ from the indoor control sections 70; and (2) a function of detecting the discriminated total heating capability.

The valve drive control circuit 603 has the following functions (1) and (2):

(1) a function of discriminating a request for a cooling or heating operation mode on the basis of the signals $H_1$, $H_2$, and $H_3$ from the indoor control sections 70; and (2) a function of controlling an opening/closing state of each of the two-way valves 25, 35, 45, 26, 36, and 46 in accordance with the discrimination result. For example, when the signals $H_1$ represents a request for a cooling operation mode, the two-way valve 25 is opened, and the two-way valve 26 is closed. When the signal $H_1$ represents a request for a heating operation mode, the two-way valve 25 is closed, and the two-way valve 26 is opened.

The operation mode determination section 604 has the following functions (1) to (3):

(1) a function of determining a cooling operation mode when a total cooling capability detected by the total cooling load detecting section 601 is larger than a total heating capability detected by the total heating load detecting section 602;

(2) a function of determining a heating operation mode when a total heating capability detected by the total heating load detecting section 602 is larger than a total cooling capability detected by the total cooling load detecting section 601; and (3) a function of supplying the determination content to the outdoor control section 50 by a signal J.

The selection circuit 605 has the following functions (1) and (2):

(1) a function of supplying a total cooling capability detected by the total cooling load detecting section 601 to the outdoor control section 50 by a signal K when a cooling operation mode is determined by the operation mode determination section 604; and (2) a function of supplying a total heating capability detected by the total heating load detecting section 602 to the outdoor control section 50 by the signal K when a heating operation mode is determined by the operation mode determination section 604.

The frost detecting section 606 detects frost attached to the indoor heat exchangers 24, 34, and 44 on the basis of the signals $I_1$, $I_2$, and $I_3$ from the indoor control sections 70.

The difference detecting circuit 611 detects a difference between a temperature of the refrigerant sensed by the temperature sensor 27 and a preset value of the preset value circuit 614.

The difference detecting circuit 612 detects a difference between a temperature of the refrigerant sensed by the temperature sensor 37 and a preset value of the preset value circuit 614.

The difference detecting circuit 613 detects a difference between a temperature of the refrigerant sensed by the temperature sensor 47 and a preset value of the preset value circuit 614.

The valve drive control circuit 607 controls the PMVs 21, 31, and 41. The circuit 607 has the following functions.

More specifically, the valve drive control circuit 607 executes the following functions (1) to (3) when a cooling operation mode is determined by the operation mode determination section 604:

(1) a function of discriminating a request for a cooling or heating operation mode on the basis of the signals $H_1$, $H_2$, and $H_3$ from the indoor control sections 70;

(2) a function of controlling the opening degree of the PMV 21 corresponding to the indoor unit $C_1$ in accordance with a cooling capability requested by the indoor unit $C_1$ when the signal $H_1$ represents a request for a cooling operation mode, of controlling the opening degree of the PMV 31 corresponding to the indoor unit $C_2$ in accordance with a cooling capability requested by the indoor unit $C_2$ when the signal $H_2$ represents a request for the cooling operation mode, and of controlling the openin degree of the PMV 41 corresponding to the indoor unit $C_3$ in accordance with a cooling capability requested by the indoor unit $C_3$ when the signal $H_3$ represents a request for the cooling operation mode; and (3) a function of controlling the opening degree of the PMV 21 corresponding to the indoor unit $C_1$ to set the difference detected by the difference detecting circuit 611 to be "0" when the signal $H_1$ represents a request for a heating operation mode, of controlling the opening degree of the PMV 31 corresponding to the indoor unit $C_2$ to set the difference detected by the difference detecting circuit 612 to be "0" when the signal $H_2$ represents a request for a heating operation mode, and of controlling the opening degree of the PMV 41 corresponding to the indoor unit $C_3$ to set the difference detected by the difference detecting circuit 613 to be "0" when the signal $H_3$ represents a request for a heating operation mode.

The valve drive control circuit 607 executes the following functions (4) to (6) when a heating operation mode is determined by the operation mode determination section 604:

(4) a function of discriminating a request for a cooling or heating operation mode on the basis of the signals $H_1$, $H_2$, and $H_3$ from the indoor control sections 70;

(5) a function of fully opening the PMV 21 corresponding to the indoor unit $C_1$ when the signal $H_1$ represents a request for a cooling operation mode (however, when the frost detecting section 606 detects frost attached to the indoor heat exchanger 24, the PMV 21 is fully closed), of fully opening the PMV 31 corresponding to the indoor unit $C_2$ when the signal $H_2$ represents a request for the cooling operation mode (however, when the frost detecting section 606 detects frost attached to the indoor heat exchanger 34, the PMV 31 is fully closed), and of fully opening the PMV 41 corresponding to the indoor unit $C_3$ when the signal $H_3$ represents a request for the cooling operation mode (however, when the frost detecting section 606 detects frost attached to the indoor heat exchanger 44, the PMV 41 is fully closed); and (6) a function of controlling the opening degree of the PMV 21 in accordance with a heating capability requested by the signal $H_1$ when the signal $H_1$ represents a request for a heating operation mode, of controlling the opening degree of the PMV 31 in accordance with a heating capability requested by the signal $H_2$ when the signal $H_2$ represents a request for the heating operation mode, and of controlling the opening degree of the PMV 41 in accordance with a heating capability requested from the signal $H_3$ when the signal $H_3$ represents a request for the heating operation mode.

A detailed arrangement of the frost detecting section 606 is shown in FIG. 4.

More specifically, the frost detecting section 606 includes comparators 621, 622, 623, 624, 625, and 626, preset value circuits 627 and 628, discrimination sections 681, 683, and 685, and timers 682, 684, and 686.

The comparator 621 outputs a logic "1" signal when a temperature of the indoor heat exchanger $C_1$ based on the signal $I_1$ is lower than a preset value, i.e.. 0° C. of the preset value circuit 627.

The comparator 622 outputs a logic "1" signal when a temperature of the indoor heat exchanger $C_1$ based on the signal $I_1$ is lower than a preset value, i.e., 5° C., of the preset value circuit 628.

The comparator 623 outputs a logic "1" signal when a temperature of the indoor heat exchanger $C_2$ based on the signal $I_2$ is ower than a preset value, i.e., 0° C., of the preset value circuit 627.

The comparator 624 outputs a logic "1" signal when a temperature of the indoor heat exchanger $C_2$ based on the signal $I_2$ is lower than a preset value, i.e., 5° C., of the preset value circuit 628.

The comparator 625 outputs a logic "1" signal when a temperature of the indoor heat exchanger $C_3$ based on the signal $I_3$ is lower than a preset value, i.e., 0° C., of the preset value circuit 627.

The comparator 626 outputs a logic "1" signal when a temperature of the indoor heat exchanger $C_3$ based on the signal $I_3$ is lower than a preset value, i.e., 5° C., of the preset value circuit 628.

The discrimination section 681 has the following functions (1) and (2):

(1) a function of outputting a frost signal set at logic "1" when a logic "1" output of the comparator 621 continues during a predetermined time period based on counting by the timer 682, e.g., 30 minutes; and (2) a function of continuing outputting of the frost signal until an output from the comparator 622 is set at logic "1".

The discrimination section 683 has the following functions (1) and (2):

(1) a function of outputting a frost signal set at logic "1" when a logic "1" output from the comparator 623 continues during a predetermined time period based on counting by the timer 684, e.g., 30 minutes; and (2) a function of continuing outputting of the frost signal until an output from the comparator 624 is set at logic "1".

The discrimination section 685 has the following functions (1) and (2):

(1) a function of outputting a frost signal set at logic "1" when a logic "1" output from the comparator 625 continues during a predetermined time period based on counting by the timer 686, e.g., 30 minutes; and (2) a function of continuing outputting of the frost signal until an output from the comparator 626 is set at logic "1".

A detailed arrangement of the outdoor control section 50 and its peripheral circuits is shown in FIG. 5.

Reference numeral 501 denotes a commercial AC power source. An inverter 502 and a voltage controller 503 are connected to the power source 501.

The inverter 502 rectifies a voltage of the power source 501. The rectified voltage is converted into an AC voltage having a predetermined frequency, and is output. An output voltage of the inverter 502 is supplied to a motor 1M for the compressor 1 as drive power.

The voltage controller 503 converts a voltage of the power source 501 into a voltage having a predetermined level to output the converted voltage. An output voltage of the voltage controller 503 is supplied to a motor 13M for the outdoor fan 13 as drive power.

The outdoor control section 50 includes an inverter drive circuit 511, a voltage controler drive circuit 512, a preset value circuit 513, a difference detecting circuit 514, a valve drive control circuit 516, a preset value circuit 517, and a difference detecting circuit 518.

The inverter drive circuit 511 has the following functions (1) and (2):

(1) a function of discriminating a total cooling or heating capability requested from each indoor unit on the basis of the signal K from the multi-control section 60; and (2) a function of controlling an output frequency of the inverter 502 in accordance with the discriminated total value.

The voltage controller drive circuit 512 has the following functions (1) and (2):

(1) a function of keeping an output voltage of the voltage controller 503 at a normal level when the signal J from the multi-control section 60 represents determination of a cooling operation mode; and (2) a function of controlling an output voltage of the voltage controller 503 to set a detection result from the difference detecting circuit 514 to be "0" when the signal J from the multi-control section 60 represents determination of a heating operation mode.

The difference detecting circuit 514 detects a difference between a pressure sensed by the pressure sensor 14 and a preset value of the preset value circuit 513.

The preset value circuit 513 has the following functions (1) and (2):

(1) a function of setting a preset value, i.e., 20 kg/m$^2$G, when the signal J from the multi-control section 60 represents determination of a cooling operation mode; and (2) a function of setting a preset value, i.e., 6 kg/m$^2$G, when the signal J from the multi-control section 60 represents determination of a heating operation mode.

The valve drive control circuit 515 has the following functions (1) and (2):

(1) a function of opening the two-way valve 4 and closing the two-way valve 12 when the signal J from the multi-control section 60 represents determination of a cooling operation mode; and (2) a function of closing the two-way valve 4 and opening the two-way valve 12 when the signal J from the multi-control section 60 represents determination of a heating operation mode.

The valve drive control circuit 516 controls the opening degree of the PMV 8 to set a detection result of the difference detecting circuit 517 to be "0" when the signal J from the multi-control section 60 represents determination of a cooling operation mode.

The difference detecting circuit 518 detects a difference between a temperature of the refrigerant sensed by the temperature sensor 15 and a preset value of the preset value circuit 517, e.g., 45° C.

With the above arrangement, an operation will be described hereinafter.

Assume that a request from the indoor units $C_1$ is a cooling operation mode, a request from the indoor unit $C_2$ is a cooling operation mode, and a request from the indoor unit $C_3$ is a heating operation mode. In addition, assume that a requested total cooling capability is larger than a requested total heating capability.

Figure 6:
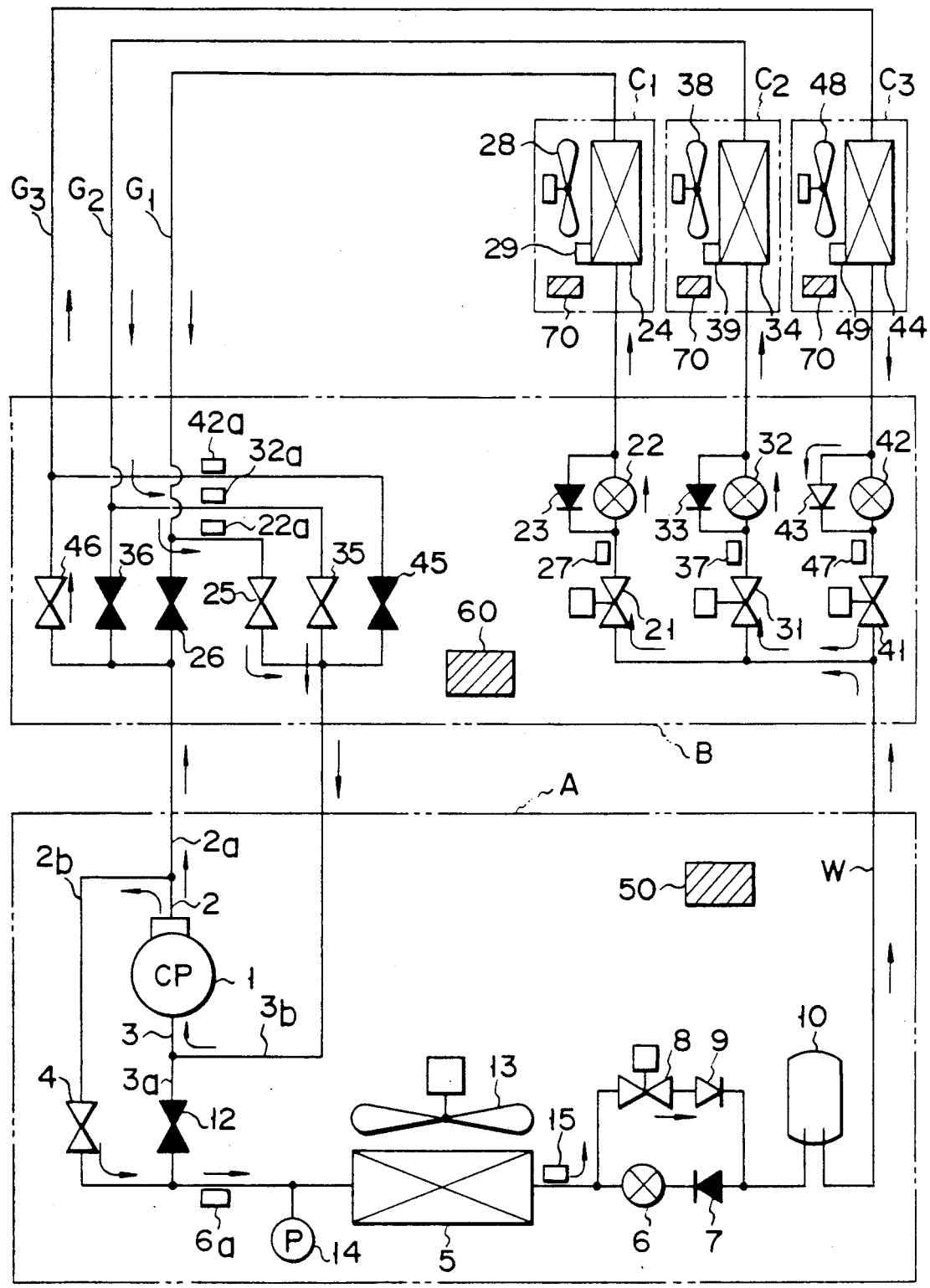
FIG. 6 is a diagram showing the flow of a refrigerant in a cooling operation mode of the multi-system air conditioning machine according to the first embodiment.

In this case, as is shown in FIG. 6, a cooling operation mode is determined, the two-way valve 4 in the outdoor unit A is opened (represented by white), and the two-way valve 12 is closed (represented by black).

In other words, the outdoor heat exchanger 5 is connected to the outlet pipe 2b of the compressor 1.

In the switching unit B, the two-way valves 25, 35, and 46 are opened (represented by white), and the two-way valves 26, 36, and 45 are closed (represented by black).

More specifically, the gas-side pipes $G_1$ and $G_2$ in the indoor units $C_1$ and $C_2$ which request a cooling operation mode are connected to the intake pipe 3b of the compressor 1. The gas-side pipe $G_3$ of the indoor unit $C_3$ which requests a heating operation mode is connected to the outlet pipe 2a of the compressor 1.

The refrigerant delivered from the compressor 1 is, therefore, supplied to the outdoor heat exchanger 5, directed to the indoor units $C_1$ and $C_2$ which request a cooling operation mode, and drawn into the compressor 1. In addition, a part of the refrigerant delivered from the compressor 1 is supplied to the indoor unit $C_3$ which requests heating operation mode. The refrigerant which flows through the indoor unit $C_3$ joins the flow of the refrigerant supplied to the indoor units $C_1$ and $C_2$ which request a cooling operation mode.

More specifically, the outdoor heat exchanger 5 serves as a condenser, the indoor heat exchangers 24 and 34 serve as evaporators, and the indoor heat exchanger 44 serves as a condenser.

In this case, the heat absorbed by the indoor units $C_1$ and $C_2$ is partially utilized to dissipate the heat from the indoor unit $C_3$.

An output frequency of the inverter 502 is set in accordance with a requested total cooling capability. Therefore, the compressor 1 exhibits a capability for sufficiently covering a cooling capability of the indoor units $C_1$ and $C_2$ each having a large load.

The opening degree of each of the PMVs 21 and 31 is at this time, controlled in accordance with the cooling capability requested from the indoor units $C_1$ and $C_2$, and the refrigerant is properly distributed to the indoor units $C_1$ and $C_2$. An amount of refrigerant supplied to the indoor heat exchangers 24 and 34 is controlled by the expansion valves 22 and 32, and a degree of superheat of the refrigerant is kept constant.

A sufficient heating capability of the indoor unit $C_3$ can be assured under the following control.

A speed of the outdoor fan 13 is controlled to Set a pressure sensed by the pressure sensor 14 to be a predetermined value (20 kg/cm$^2$G).

At the same time, the opening degree of the PMV 8 is controlled to set a temperature of the refrigerant supplied from the outdoor heat exchanger 5, i.e., a degree of supercool, to be constant. In addition, the opening degree of the PMV 41 is controlled to set a temperature of the refrigerant supplied from the indoor heat exchanger 44, i.e., a degree of supercool, to be constant.

For example, when the temperature of outer air is decreased, a condensation temperature of the refrigerant supplied to the outdoor heat exchanger 5 is reduced, thus undesirably degrading a heating capability of the indoor unit $C_3$. However, since the speed of the outdoor fan 13 is controlled as described above, such a disadvantage can be prevented.

More specifically, as is shown in FIG. 7, when a condensation temperature is reduced, an amount of wind supply from the outdoor fan 13 is decreased. Therefore, heat dissipation from the outdoor heat exchanger 5 is decreased to keep high condensation temperature.

Note that the opening degree of the PMV 8 is controlled so that a temperature of the refrigerant supplied from the outdoor heat exchanger 5 is set to be constant, e.g., 45° C. The opening degree of the PMV 41 is controlled so that a temperature of the refrigerant supplied from the indoor heat exchanger 44 is set to be constant, e.g., 45° C.

Assume that a request from the indoor unit $C_1$ is a heating operation mode, a request from the indoor unit $C_2$ is a heating operation mode, and a request from the indoor unit $C_3$ is a cooling operation mode. In addition, assume that a requested total heating capability is larger than a requested total cooling capability.

Figure 8:
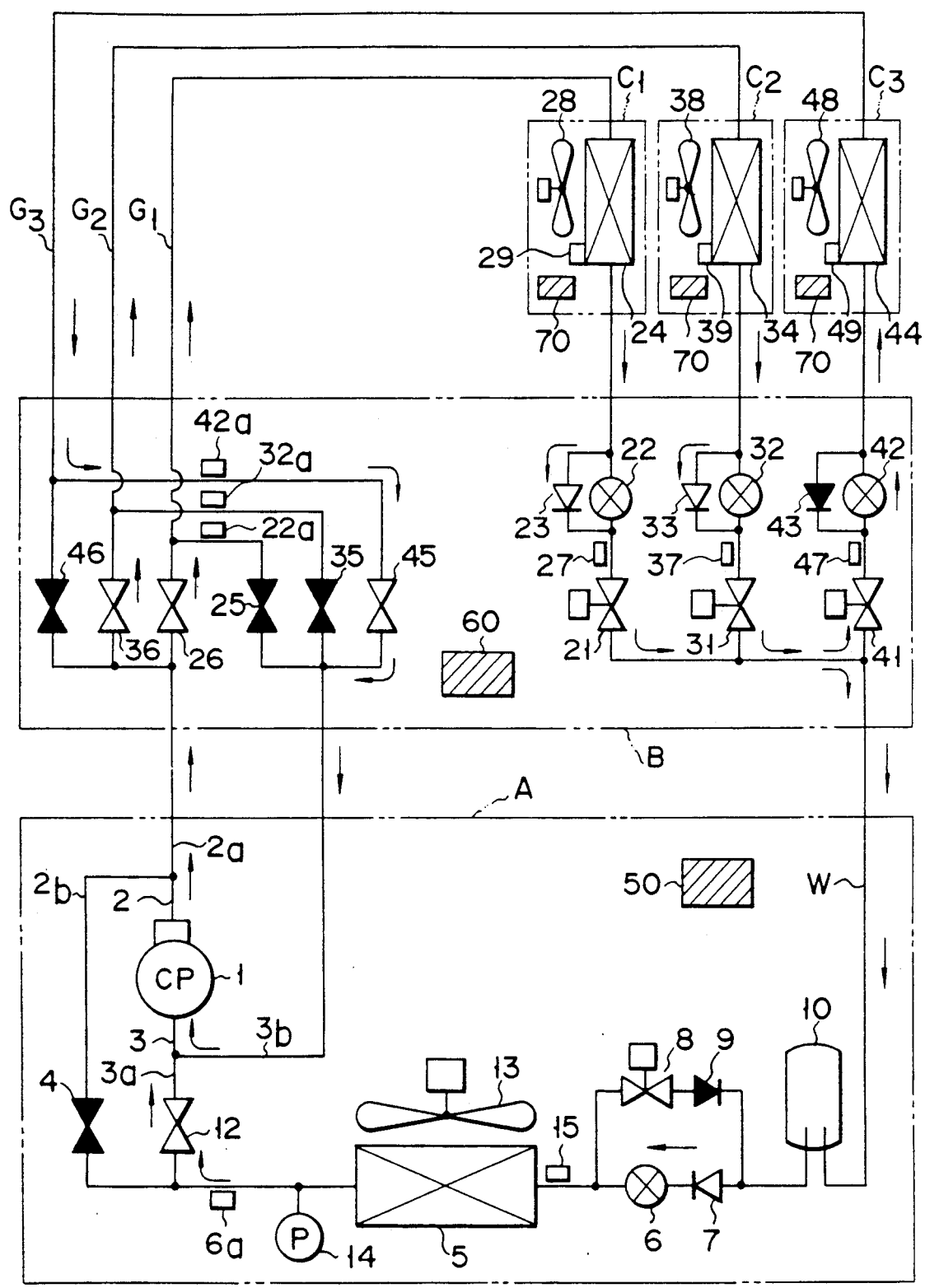
FIG. 8 is a diagram showing the flow of the refrigerant in a heating operation mode of the multi-system air conditioning machine according to the first embodiment.

In this case, as is shown in FIG. 8, a heating operation mode is determined, the two-way valve 4 in the outdoor unit A is closed (represented by black), and the two-way valve 12 is opened (represented by white).

In other words, the outdoor heat exchanger 5 is connected to the intake pipe 3a of the compressor 1.

In the switching unit B, the two-way valves 45, 26, and 36 are opened (represented by white), and the two-way valves 25, 35, and 46 are closed (represented by black).

More specifically, the gas-side pipes $G_1$ and $G_2$ in the indoor units $C_1$ and $C_2$ which request a heating operation mode are connected to the outlet pipe 2a of the compressor 1. The gas-side pipe $G_3$ of the indoor unit $C_3$ which requests a cooling operation mode is connected to the intake pipe 3b of the compressor 1.

The refrigerant delivered from the compressor 1 is, therefore, supplied to the indoor units $C_1$ and $C_2$ which request a heating operation mode, supplied to the outdoor heat exchanger 5, and drawn into the compressor 1. In addition, the refrigerant which flows through the indoor units $C_1$ and $C_2$ is partially supplied to the indoor unit $C_3$ which requests a cooling operation mode. The refrigerant which flows through the indoor unit $C_3$ merges the flow of the refrigerant to the intake side of the compressor 1.

More specifically, the indoor heat exchangers 24 and 34 serve as condensers, the outdoor heat exchanger 5 serves as an evaporator, and the indoor heat exchanger 44 serves as an evaporator.

In this case, the heat absorbed by the outdoor and indoor heat exchangers 5 and 44 is utilized to dissipate the heat from the indoor units $C_1$ and $C_2$.

An output frequency of the inverter 502 is set in accordance with a requested total heating capability. Therefore, the compressor 1 exhibits a capability for sufficiently covering a heating capability of the indoor units $C_1$ and $C_2$ each having a large load.

At this time, the opening degree of each of the PMVs 21 and 31 is controlled in accordance with the heating capability requested from the indoor units $C_1$ and $C_2$, and the refrigerant is properly distributed to the indoor units $C_1$ and $C_2$.

A sufficient cooling capability of the indoor unit $C_3$ can be assured under the following control.

A speed of the outdoor fan 13 is controlled to set a pressure sensed by the pressure sensor 14 to be a predetermined value (6 kg/cm$^2$G). At the same time, an amount of refrigerant supplied to the outdoor heat exchanger 5 is controlled by the expansion valve 6, and a degree of superheat of the refrigerant is kept constant. In addition, an amount of the refrigerant supplied to the indoor heat exchanger 44 is controlled by the expansion valve 42, and a degree of superheat of the refrigerant is kept constant.

For example, when the temperature of an outer air is increased, an evaporation temperature of the refrigerant supplied to the outdoor heat exchanger 5 is increased, thus undesirably degrading a cooling capability of the indoor unit $C_3$. However, since the speed of the outdoor fan 13 is controlled as described above, such a disadvantage can be prevented.

More specifically, as is shown in FIG. 9, when an evaporation temperature is increased, an amount of wind supply from the outdoor fan 13 is decreased. At this time, an amount of the evaporated refrigerant in the outdoor heat exchanger 5 is decreased, and a liquid refrigerant which cannot be evaporated returns to the compressor 1. Then, the opening degree of the expansion valve 6 is increased to suppress an increase in evaporation temperature.

In this case, a speed of the outdoor fan 13 is controlled in accordance with a pressure of the refrigerant sensed by the pressure sensor 14. However, the speed of the outdoor fan 13 may be controlled in accordance with a temperature of the refrigerant.

In this heating operation mode, when the temperature of outer air is decreased to be 0° C. or less, a temperature of the indoor heat exchanger 44 on the cooling side is also set to be 0° C. or less. In other words, frost is attached to the surface of the indoor heat exchanger 4.

Defrosting control shown in FIG. 10 is, therefore, executed, as needed.

More specifically, a temperature tc of the indoor heat exchanger 44 is sensed by the temperature sensor 49, and it is monitored whether the detected temperature tc is 0° C. or less (step P1).

If the detected temperature tc is set to be 0° C. or less, a timer count T is started (step P2).

If the detected temperature tc returns to 0° C. or more before the timer count T reaches a preset value $T_1$, e.g., 30 minutes (step P3), the timer count T is cleared (step P4).

If the timer count T reaches the preset value $T_1$ while the detected temperature tc is set to be 0° C. or less (step P3), the PMV 41 corresponding to the indoor heat exchanger 44 is fully closed (step P5). In other words, the flow of the refrigerant into the indoor heat exchanger 44 is limited.

At this time, an operation of the indoor fan 48 is normally continued (step P6).

Thus, the flow of the refrigerant into the indoor heat exchanger 44 is limited, and ventilation of the indoor heat exchanger 44 continues, thus defrosting the indoor heat exchanger 44. In addition, cool wind is generated upon defrosting, and is supplied into the room. Therefore, a cooling operation is not interrupted.

When defrosting continues and the detected temperature tc is set to be 5° C. or more (step P7), the PMV 41 is fully opened (step P8), thus returning to a normal operation.

Note that the similar defrosting control is executed upon an operation in which the indoor heat exchanger 24 or 34 is on the cooling side.

Figure 11:
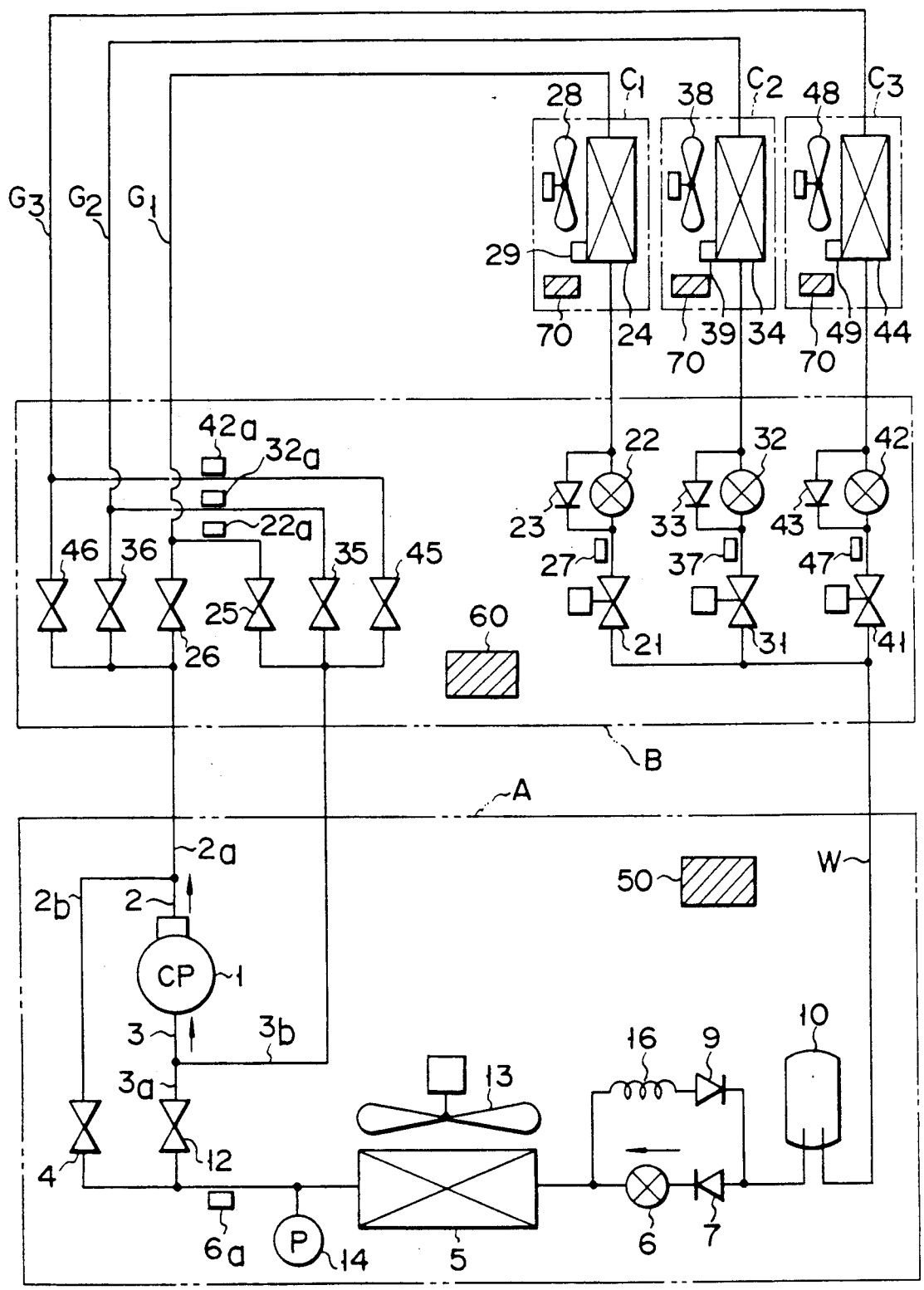
FIG. 11 is a diagram showing an entire arrangement of a multi-system air conditioning machine according to the second embodiment of the present invention.

The second embodiment of the present invention is shown in FIG. 11.

In this embodiment, a capillary tube 16 is employed in place of a PMV 8 in an outdoor unit A. The other arrangements are the same as in the first embodiment.

Figure 13:
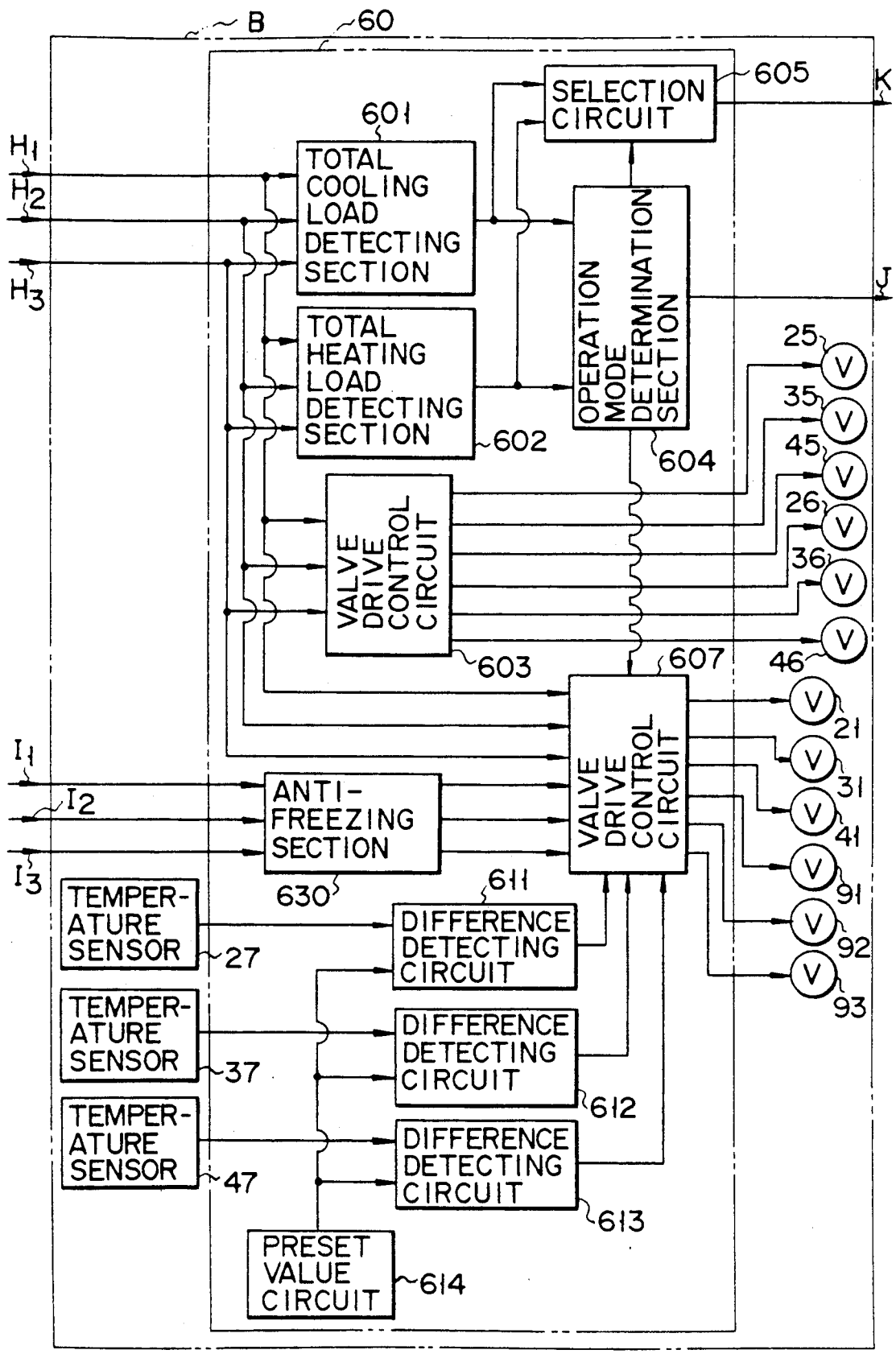
FIG. 13 is a block diagram showing a multi-control section and its peripheral sections of the multi-system air conditioning machine according to the third embodiment.
Figure 14:
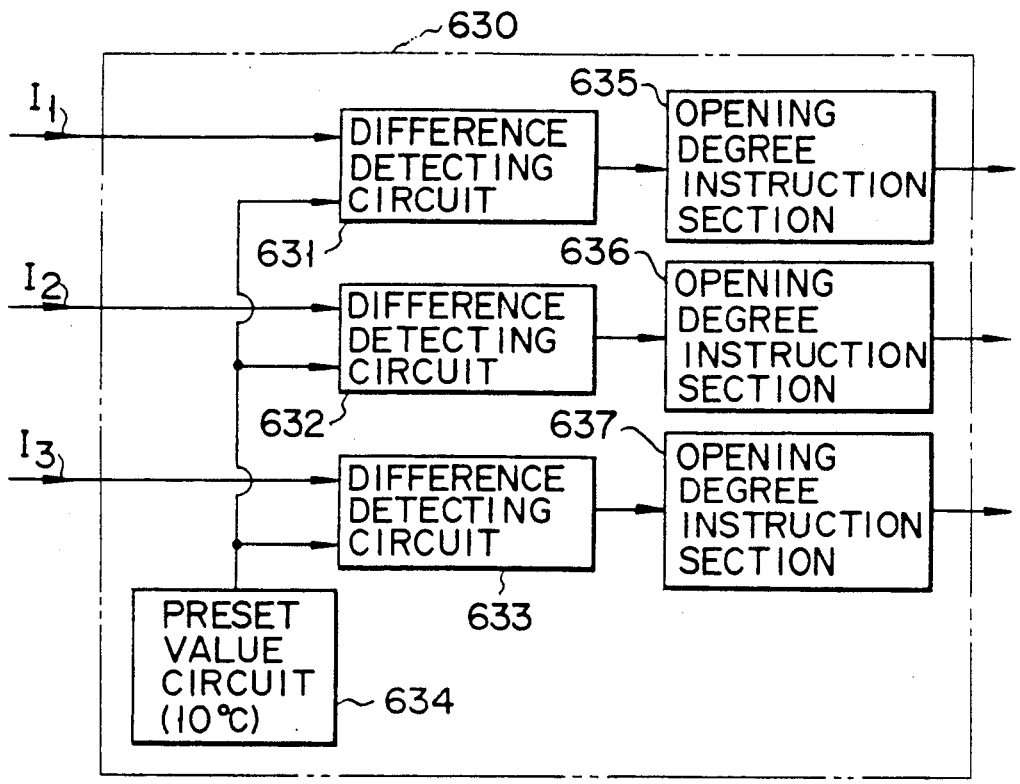
FIG. 14 is a block diagram showing a detailed arrangement of an antifreezing section in the multi-control section of the multi-system air conditioning machine according to the third embodiment.

The third embodiment of the present invention is shown in FIGS. 12 and 13. The same reference numerals in FIGS. 12 and 13 denote the same parts as in the above embodiments, and a description thereof will be omitted.

In this embodiment, PMVs 91, 92, and 93 are disposed at gas-side pipes $G_1$, $G_2$, and $G_3$ respectively.

The PMVs 91, 92, and 93 are connected to a valve drive control circuit 607 in a multi-control section 60.

An antifreezing section 630 is arranged in place of a frost detecting section 606.

The antifreezing section 630 includes difference detecting circuits 631, 632, and 633, a preset circuit 634, and opening degree instruction sections 635, 636, and 637.

A comparator 621 detects a difference between a temperature of an indoor heat exchanger $C_1$ based on a signal $I_1$ and a preset value, i.e., 10° C., of the preset value circuit 634.

A comparator 622 detects a difference between a temperature of the indoor heat exchanger $C_1$ based on the signal $I_1$ and a preset value, i.e., 10° C., of the preset value circuit 634.

A comparator 623 detects a difference between a temperature of an indoor heat exchanger $C_2$ based on a signal $I_2$ and a preset value, i.e., 10° C., of the preset value circuit 634.

The opening degree instruction section 635 sets the opening degree of the PMV 91 in accordance with a difference in temperature detected by the difference detecting circuit 631. More specifically, the opening degree of the PMV 91 is set so that a temperature of the indoor heat exchanger $C_1$ exceeds a preset value, i.e., 10° C.

The opening degree instruction section 636 sets the opening degree of the PMV 92 in accordance with a difference in temperature detected by the difference detecting circuit 632. More specifically, the opening degree of the PMV 92 is set so that a temperature of the indoor heat exchanger $C_2$ exceeds a preset value, i.e., 10° C.

The opening degree instruction section 637 sets an opening degree of the PMV 93 in accordance with a difference in temperature detected by the difference detecting circuit 633. More specifically, the opening degree of the PMV 93 is set so that a temperature of an indoor heat exchanger $C_3$ exceeds a preset value, i.e., 10° C.

The valve drive control circuit 607 has a function of controlling the opening degree of each of the PMVs 91, 92, and 93 in response to an opening degree instruction from the antifreezing section 630 in addition to the functions described in the first embodiment.

An operation will be described below.

The flow of the refrigerant in FIG. 12 represets a heating operation mode. When the temperature of outer air is decreased, a temperature of an indoor heat exchanger 44 on the cooling side is also decreased. In other words, the indoor heat exchanger 44 may be undesirably frosted or frozen.

Figure 15:
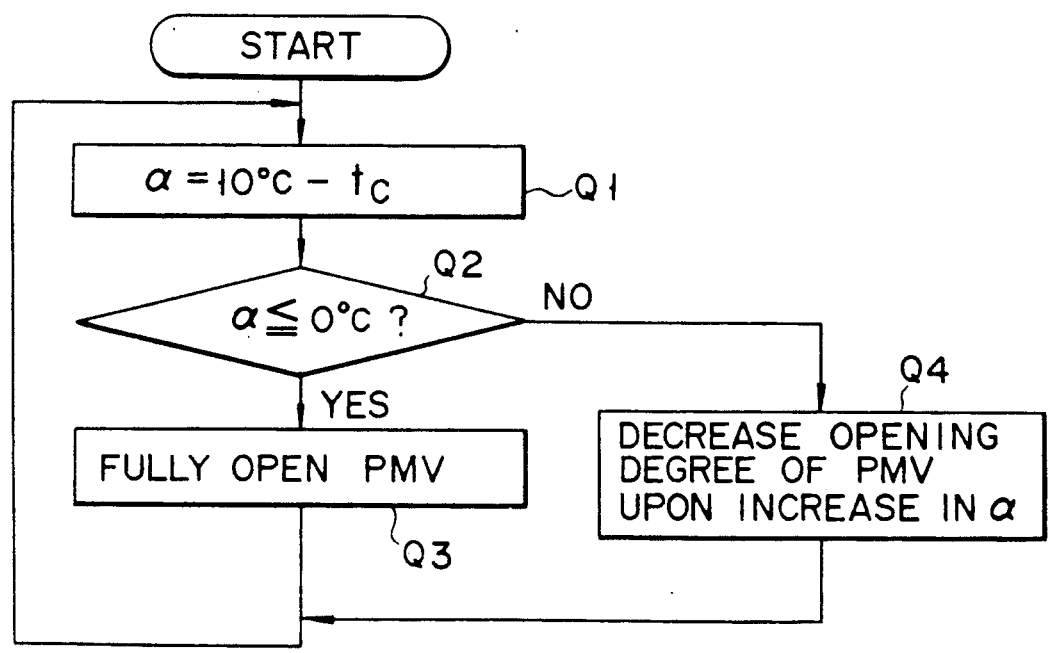
FIG. 15 is a flow chart for explaining antifreezing control of the multi-system air conditioning machine according to the third embodiment.

Antifreezing control shown in FIGS. 15 and 16 is, therefore, executed, as needed.

More specifically, a temperature tc of the indoor heat exchanger 44 on the cooling side is sensed by a temperature sensor 49, and a difference $\alpha(=10°\text{ C.}-\text{tc})$ between the detected temperature tc and the preset value, i.e., 10° C., is obtained (step Q1).

When the detected temperature tc is 10° C. or more, i.e., the difference $\alpha$ is set to be a negative value (step Q2), the PMV 93 is fully opened to continue a normal operation (step Q3).

However, when the detected temperature tc is lowered to be 10° C. or less, i.e., the difference $\alpha$ is set to be a positive value (step Q2), the opening degree of the PMV 93 is decreased as the difference $\alpha$ is increased.

When the opening degree of the PMV 93 is decreased, the flow of the refrigerant into the indoor heat exchanger 44 is limited.

A state of the refrigerating apparatus in this case is shown in FIGS. 17 and 18.

More specifically, as the temperature of outer air is decreased, the evaporation temperature of the indoor heat exchanger 44 is decreased to be equal to the evaporation temperature of an outdoor heat exchanger 5, as shown in FIG. 17.

When the above-mentioned antifreezing control is executed, however, the evaporation temperature of the indoor heat exchanger 44 is increased as shown in FIG. 18.

The indoor heat exchanger 44 can be protected from being frosted and frozen in advance, therefore, a cooling operation of the indoor unit $C_3$ can continue.

Figure 19:
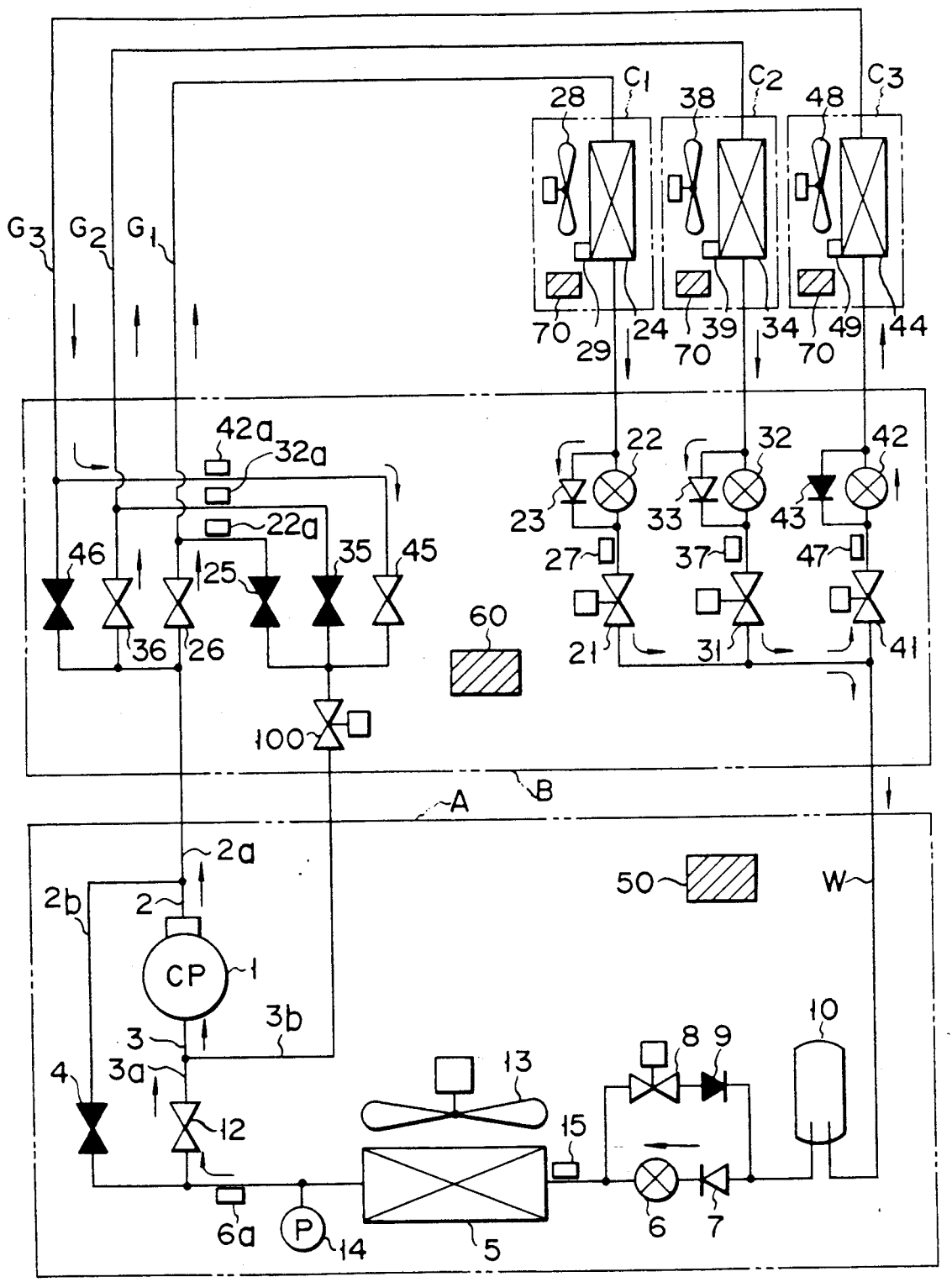
FIG. 19 is a diagram showing an entire arrangement of a multi-system air conditioning machine according to the fourth embodiment of the present invention.

The fourth embodiment of the present invention is shown in FIGS. 19 and 20. The same reference numerals in FIGS. 19 and 20 denote the same parts as in the above embodiments, and a description thereof will be omitted.

In this embodiment, PMVs 91, 92, and 93 in the third embodiment are removed, and one PMV 100 is disposed at a pipe connected to an intake pipe 3b, in place of the PMVs.

The PMV 100 is connected to a valve drive control circuit 607 in a multi-control section 60.

An opening degree instruction section 635 in an antifreezing section 630 sets an opening degree of the PMV 100 in accordance with a difference in temperature detected by a difference detecting circuit 631. More specifically, the opening degree of the PMV 100 is set so that a temperature of an indoor heat exchanger $C_1$ exceeds a preset value, i.e., 10° C.

An opening degree instruction section 636 in the antifreezing section 630 sets an opening degree of the PMV 100 in accordance with a difference in temperature detected by a difference detecting circuit 632. More specifically, the opening degree of the PMV 100 is set so that a temperature of an indoor heat exchanger $C_2$ exceeds a preset value, i.e., 10° C.

An opening degree instruction section 637 in the antifreezing section 630 sets an opening degree of the PMV 100 in accordance with a difference in temperature detected by a difference detecting circuit 633. More specifically, the opening degree of the PMV 100 is set so that a temperature of an indoor heat exchanger $C_3$ exceeds a preset value, i.e., 10° C.

The valve drive control circuit 607 has a function of controlling the opening degree of the PMV 100 in response to an opening degree instruction from the antifreezing section 630 in addition to the functions described in the first embodiment.

An operation will be described below.

The flow of the refrigerant in FIG. 19 represents a heating operation mode. When the temperature of outer air is decreased, a temperature of an indoor heat exchanger 44 on the cooling side is also decreased. In other words, the indoor heat exchanger 44 may be undesirably frosted or frozen.

Antifreezing control shown in FIGS. 15 and 16 is, therefore, executed, as needed.

More specifically, a temperature tc of the indoor heat exchanger 44 on the cooling side is sensed by a temperature sensor 49, and a difference $\alpha(=10°\text{ C.}-\text{tc})$ between the detected temperature tc and the preset value, i.e., 10° C., is obtained (step Q1).

When the detected temperature tc is 10° C. or more, i.e., the difference $\alpha$ is set to be a negative value (step Q2), the PMV 100 is fully opened to continue a normal operation (step Q3).

However, when the detected temperature tc is lowered to be 10° C. or less, i.e., the difference $\alpha$ is set to be a positive value (step Q2), the opening degree of the PMV 100 is decreased as the difference $\alpha$ is increased.

When the opening degree of the PMV 100 is decreased, the flow of the refrigerant into the indoor heat exchanger 44 is limited.

The temperature of indoor heat exchanger 44 is, therefore, kept in an optimal state within a predetermined range. In other words, the indoor heat exchanger 44 can be protected from being frosted or frozen in advance, and a cooling operation of the indoor unit $C_3$ can be continued.

Th fifth embodiment of the present invention is shown in FIGS. 21 and 22. The same reference numerals in FIGS. 21 and 22 denote the same parts as in the above embodiments, and a description thereof will be omitted.

In this embodiment, PMVs 91, 92, and 93 used in the third embodiment are connected in parallel to two-way valves 25, 35, and 45, respectively.

An antifreezing section 630 is connected to a valve drive control circuit 603 for controlling the two-way valves 25, 35, and 45.

In the antifreezing section 630 in this embodiment, an opening degree instruction section 635 sets an opening degree of the PMV 91 in accordance with a difference in temperature detected by a difference detecting circuit 631. More specifically, if the temperature of an indoor heat exchanger $C_1$ is higher than a present value, i.e., 10° C., the PMV 91 is fully closed. If the temperature is lower than the preset value, i.e., 10° C., the opening degree of the PMV 91 is appropriately set.

In the antifreezing section 630, an opening degree instruction section 636 sets an opening degree of the PMV 92 in accordance with a difference in temperature detected by a difference detecting circuit 632. More specifically, if the temperature of an indoor heat exchanger $C_2$ is higher than a preset value, i.e., 10° C., the PMV 92 is fully closed. If the temperature is lower than the preset value, i.e., 10° C., the opening degree of the PMV 92 is appropriately set.

In the antifreezing section 630, an opening degree instruction section 637 sets an opening degree of the PMV 93 in accordance with a difference in temperature detected by a difference detecting circuit 633. More specifically, if the temperature of an indoor heat exchanger $C_3$ is higher than a preset value, i.e., 10° C., the PMV 93 is fully closed. If the temperature is lower than the preset value, i.e., 10° C., the opening degree of the PMV 93 is appropriately set.

A valve drive control circuit 607 has a function of controlling the opening degrees of the PMVs 91, 92, and 93 in response to instructions from the antifreezing section 630 in addition to a function of controlling PMVs 21, 31, and 41.

A valve drive control circuit 603 closes the corresponding one of the two-way valves 25, 35, and 45 when the antifreezing section 630 outputs an instruction to open each of the PMvs 91, 92, and 93.

An operation will be described hereinafter.

The flow of a refrigerant in FIG. 21 represents a heatin operation mode. When the temperature of an outer air is decreased, a temperature of a cooling-side indoor heat exchanger 44 is also decreased. In other words, the indoor heat exchanger 44 may frost or freeze.

Figure 23:
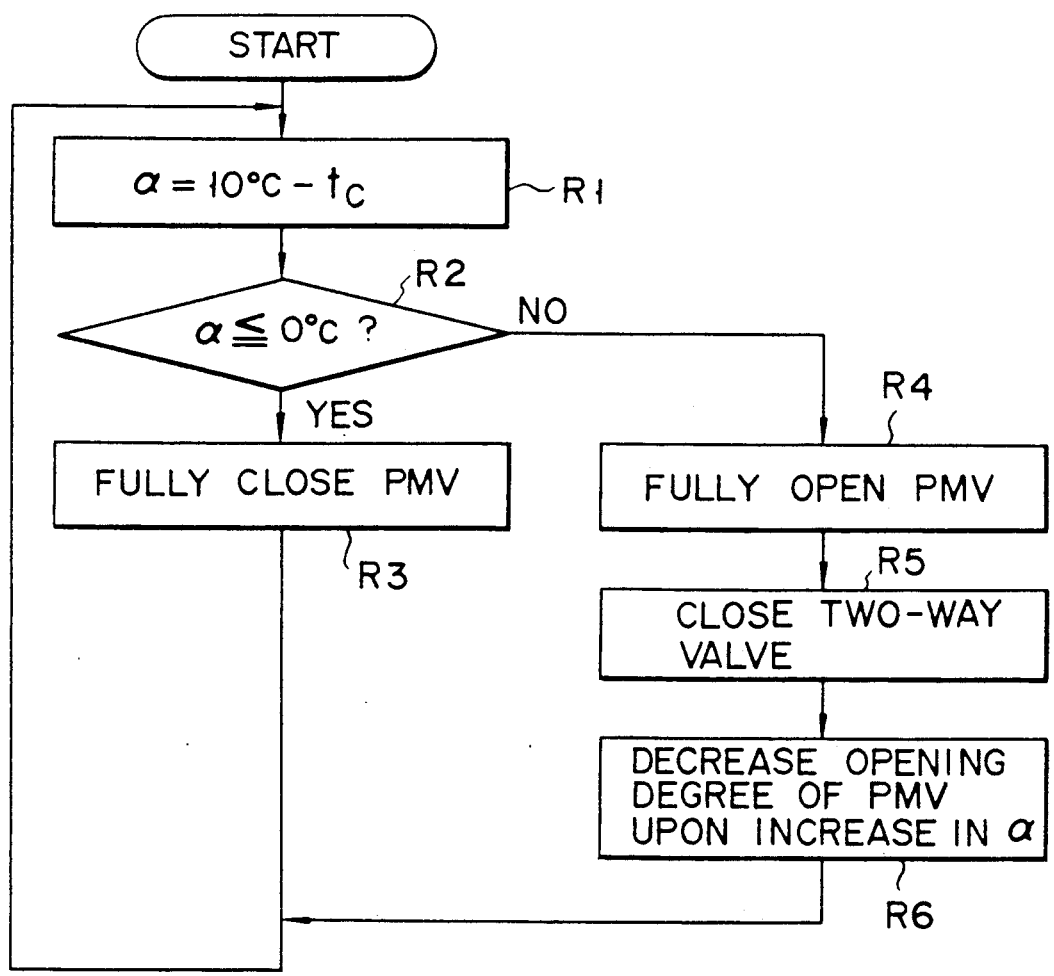
FIG. 23 is a flow chart for explaining antifreezing control of the multi-system air conditioning machine according to the fifth embodiment.

Antifreezing control shown in FIG. 23 is, therefore, executed, as needed.

More specifically, a temperature tc of the coolingside indoor heat exchanger 44 is sensed by a temperature sensor 49, and a difference $\alpha(=10°\text{ C.}-\text{tc})$ between the sensed temperature tc and a preset value, i.e., 10° C., is obtained (step R1).

If the sensed temperature tc is 10° C. or more, and the difference $\alpha$ is set to be a negative value (step R2), the PMV 93 is fully closed, and the two-way valve 45 is opened (step R3). Therefore, a normal cooling operation continues in the indoor unit $C_3$ (step R3).

If the sensed temperature tc is decreased to be 10° C. or less, and the difference o is set to be a positive value (step R2), the PMV 93 is temporarily and fully opened, as shown in FIG. 21 (step R4). At the same time, the two-way valve 45 is closed (step R5). The opening degree of the PMV 93 is decreased as the difference c is increased (step R6).

When the opening degree of the PMV 93 is decreased while the two-way valve 45 is closed, flowing of the refrigerant into the indoor heat exchanger 44 is imited.

The temperature of indoor heat exchanger 44 is, therefore, kept in an optimal state within a predetermined range. In other words, the indoor heat exchanger 44 can be protected from being frosted or frozen in advance, and a cooling operation of the indoor unit $C_3$ can be continued.

Note that the similar defrosting control is executed upon an operation in which an indoor heat exchanger 24 or 34 is on a cooling side.

The sixth embodiment of the present invention will be described hereinafter with reference to FIGS. 24, 25, and 26. The same reference numerals in FIGS. 24, 25, and 26 denote the same parts as in the above embodiments, and a description thereof will be omitted.

In this embodiment, bypass two-way valves 94, 95, and 96 are connected in parallel to two-way valves 25, 35, and 45, respectively. Capillary tubes 97, 98, and 99 are connected to bypass pipes, respectively.

An antifreezing section 640 is arranged in place of an antifreezing section 630. The antifreezing section 640 is not connected to a valve drive control circuit 607, but connected to valve drive control circuits 603 and 660.

The antifreezing section 640 includes comparators 641, 642, 643, 644, 645, and 646, preset value circuits 647 and 648, and opening degree instruction sections 649, 650, and 651.

The comparator 641 outputs a logic "1" signal when a temperature of an indoor heat exchanger $C_1$ based on a signal $I_1$ is lower than a preset value, i.e., 5° C., of the preset value circuit 647.

The comparator 642 outputs a logic "1" signal when a temperature of the indoor heat exchanger $C_1$ based on the signal $I_1$ is higher than a preset value, i.e., 10° C., of the preset value circuit 648.

The comparator 643 outputs a logic "1" signal when a temperature of an indoor heat exchanger $C_2$ based on a signal $I_2$ is lower than a preset value, i.e., 5° C., of the preset value circuit 647.

The comparator 644 outputs a logic "1" signal when a temperature of the indoor heat exchanger $C_2$ based on the signal $I_2$ is higher than a preset value, i.e., 10° C., of the preset value circuit 648.

The comparator 645 outputs a logic "1" signal when a temperature of an indoor heat exchanger $C_3$ based on a signal $I_3$ is lower than a preset value, i.e., 5° C., of the preset value circuit 647.

The comparator 646 outputs a logic "1" signal when a temperature of the indoor heat exchanger $C_3$ based on the signal $I_3$ if higher than a prsent value, i.e., 10° C., of the preset value circuit 648.

The opening degree instruction section 649 sets an opening state of the two-way valve 94 when an output from the comparator 641 is set at logic "1". Thereafter, the section 649 sets a closing state of the two-way valve 94 when an output from the comparator 642 is set at logic "1".

Th opening degree instruction section 650 sets an opening state of the two-way valve 95 when an output from the comparator 643 is set at logic "1". Thereafter, the section 650 sets a closing state of the two-way valve 95 when an output from the comparator 644 is set at logic "1".

The opening degree instruction section 651 sets an opening state of the two-way valve 96 when an output from the comparator 645 is set at logic "1". Thereafter, the section 651 sets a closing state of the two-way valve 96 when an output from the comparator 646 is set at logic "1".

The valve drive control circuit 660 controls an opening/closing state of the two-way valves 94, 95, and 96 in response to an instruction from the antifreezing section 640.

The valve drive control circuit 603 closes the corresponding one of the two-way valves 25, 35, and 45 when the antifreezing section 640 outputs an instruction to open each of the two-way valves 94, 95, and 96.

An operation will be described hereinafter.

The flow of a refrigerant in FIG. 24 represents a heating operation mode. When the temperature of outer air is decreased, a temperature of a cooling-side indoor heat exchanger 44 is also decreased. In other words, the indoor heat exchanger 44 may frost or freeze.

Figure 27:
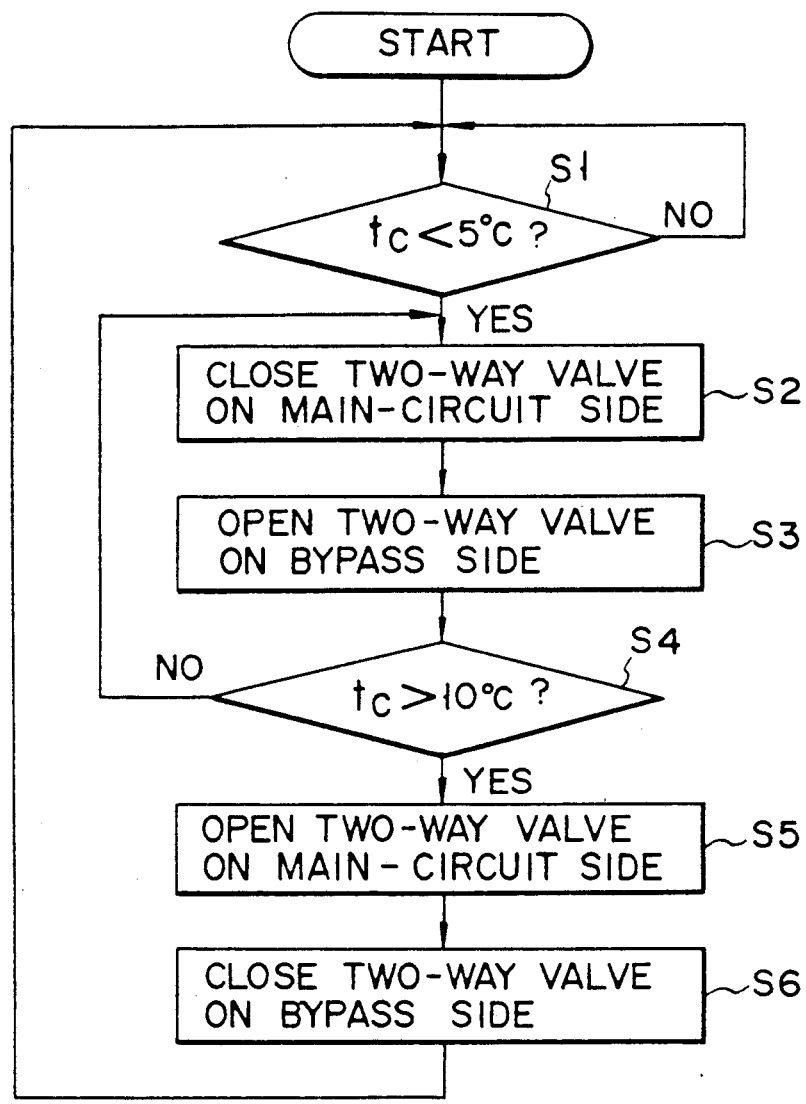
FIG. 27 is a flow chart for explaining an operation of the sixth embodiment.
Figure 28:
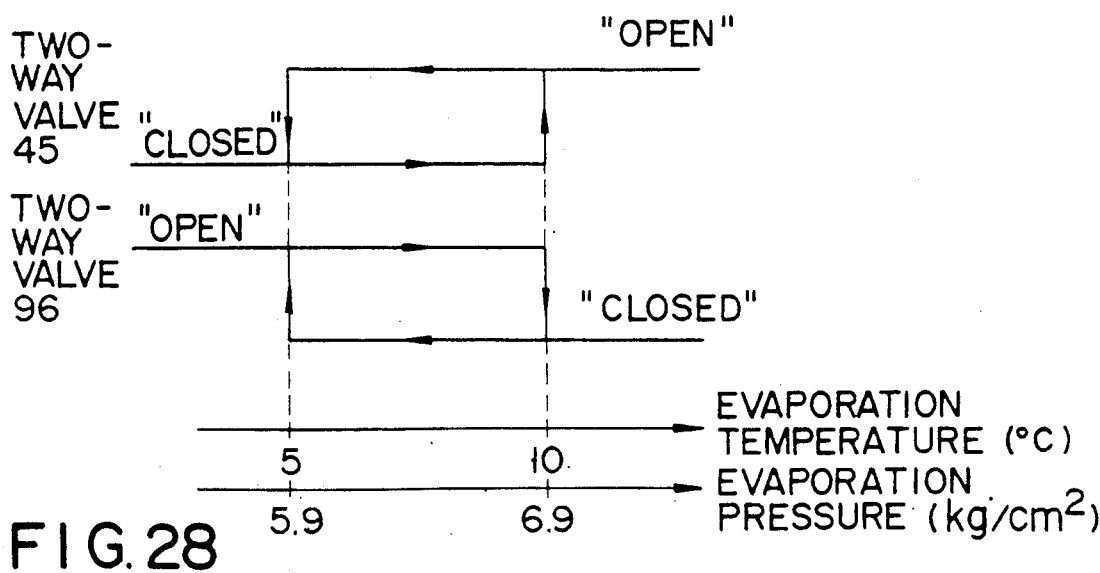
FIG. 28 is a diagram explaining how the two-way valve is opened and closed in the sixth embodiment.

Antifreezing control shown in FIGS. 27 and 28 is, therefore, executed, as needed.

More specifically, a temperature tc of the coolingside indoor heat exchanger 44 is sensed by a temperature sensor 49, and it is monitored whether the sensed temperature tc is 5° C. or less (step S1).

If the sensed temperature tc is decreased to be lower than 5° C., the two-way valve 45 on the main-circuit side is closed (step S2). At the same time, the two-way valve 96 on the bypass side is opened (step S3).

When the two-way valve 45 is closed and the two-way valve 96 is opened, the capillary tube 99 is connected to the refrigerant flow path in the indoor heat exchanger 44. Therefore, the flow of th refrigerant into the indoor heat exchanger 44 is limited.

A temperature of the indoor heat exchanger 44 is, therefore, kept in an optimal state within a predetermined range. In other words, The indoor heat exchanger 44 can be protected from being frosted or frozen in advance, and a cooling operation of the indoor unit $C_3$ can be continued.

Thereafter, if the sensed temperature tc returns to 10° C. or more (step S4), the two-way valve 45 on the main-circuit side is opened (step S5). At the same time, the two-way valve 96 on the bypass side is closed (step S6).

More specifically, when the exchanger 44 is free from frosting or freezing, limitation of the flow of the refrigerant is released, and the apparatus returns to a normal operation.

Note that the similar defrosting control is executed upon an operation in which an indoor heat exchanger 24 or 34 is on the cooling side.

Although a case wherein the three indoor units are used is exemplified in the above embodiments, the present invention is not limited thereto, and four or more indoor units may be employed.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A multi-system air conditioning machine comprising:

an outdoor unit including a compressor for drawing, compressing, and delivering a refrigerant, an outdoor heat exchanger for exchanging heat of the supplied refrigerant and heat of outer air, and an outdoor fan for circulating the outer air in said outdoor heat exchanger;

a plurality of indoor units each including an indoor heat exchanger for exchanging the heat of the supplied refrigerant and heat of inner air, and an indoor fan for circulating the inner air in said indoor heat exchanger, for requesting a cooling operation mode and a cooling capability or a heating operation mode and a heating capability;

means for supplying the refrigerant delivered from said compressor to said outdoor heat exchanger, supplying the refrigerant to one or said plurality of indoor units which request a cooling operation mode, and returning the refrigerant to said compressor when a total cooling capability requested from one or said plurality of indoor units is larger than a total heating capability requested from the remaining one or plurality of indoor units;

means for supplying a part of the refrigerant delivered from said compressor to one or said plurality of indoor units which request a heating operation mode to cause the part of refrigerant to join the flow of the refrigerant to one or said plurality of indoor units which request a cooling operation mode, when a total cooling capability requested from one or said plurality of indoor units is larger than a total cooling capability requested from the remaining one or plurality of indoor units;

means for supplying the refrigerant delivered from said compressor to one or said plurality of indoor units which request a heating operation mode, supplying the refrigerant to said outdoor heat exchanger, and returning the refrigerant to said compressor, when a total heating capability requested from one or said plurality of indoor units is larger than a total cooling capability requested from the remaining one or plurality of indoor units;

means for supplying a part of the refrigerant supplied from one or said plurality of indoor units which request a heating operation mode to one or said plurality of indoor units which request a cooling operation mode, and returning the refrigerant to said compressor, when a total heating capability requested from one of said plurality of indoor units is larger than a total cooling capability requested from the remaining one or plurality of indoor units;

first detecting means for detecting a degree of superheat or supercool of the refrigerant in said outdoor heat exchanger;

regulating means for regulating an amount of refrigerant supplied to said outdoor heat exchanger to set a detection result of said first detecting means to be constant;

second detecting means for detecting a pressure or temperature of the refrigerant in said outdoor heat exchanger; and controlling means for controlling a speed of said outdoor fan to set a detection result of said second detecting means to be constant.

2. A machine according to claim 1, wherein said first detecting means is an expansion valve for detecting the degree of superheat.

3. A machine according to claim 1, wherein said first detecting means is a temperature sensor for sensing the degree of supercool.

4. A machine according to claim 1, wherein said regulating means is an expansion valve.

5. A machine according to claim 1, wherein said regulating means includes a pulse motor valve.

6. A machine according to claim 3, further comprising a voltage controller for supplying drive power to said outdoor fan.

7. A machine according to claim 6, wherein said voltage controller converts a voltage of a commercial AC power source into a voltage having a predetermined level to output the converted voltage.

8. A machine according to claim 6, wherein said controlling means controls the output voltage from said voltage controller.

9. A multi-system air conditioning machine comprising:

an outdoor unit including a compressor for drawing, compressing, and delivering a refrigerant, and an outdoor heat exchanger for exchanging heat of the supplied refrigerant and heat of outer air;

a plurality of indoor units each including an indoor heat exchanger for exchanging the heat of the supplied refrigerant and the heat of inner air, for requesting a cooling operation mode and a cooling capability or a heating operation mode and a heating capability;

means for supplying the refrigerant delivered from said compressor to said outdoor heat exchanger, supplying the refrigerant to one or said plurality of indoor units which request a cooling operation mode, and returning the refrigerant to said compressor when a total cooling capability requested from one or said plurality of indoor units is larger than a total heating capability requested from the remaining one or plurality of indoor units;

means for supplying a part of the refrigerant delivered from said compressor to one or said plurality of indoor units which request a heating operation mode to cause the part of refrigerant to join the flow of the refrigerant to one or said plurality of indoor units which request a cooling operation mode, when a total cooling capability requested from one or said plurality of indoor units is larger than a total heating capability requested from the remaining one or plurality of indoor units;

means for supplying the refrigerant delivered from said compressor to one or said plurality of indoor units which request a heating operation mode, supplying the refrigerant to said outdoor heat exchanger, and returning the refrigerant to said compressor, when a total heating capability requested from one or said plurality of indoor units is larger than a total cooling capability requested from the remaining one or plurality of indoor units;

means for supplying a part of the refrigerant supplied from one or said plurality of indoor units which request a heating operation mode to one or said plurality of indoor units which request a cooling operation mode, and returning the refrigerant to said compressor, when a total heating capability requested from one or said plurality of indoor units is larger than a total cooling capability requested from the remaining one or plurality of indoor units;

a plurality of detecting means for respectively detecting temperatures of said plurality of indoor heat exchangers; and limiting means for limiting flowing of the refrigerant into the corresponding one of said indoor units when a detection result of each of said detecting means is not more than a predetermined value.

10. A machine according to claim 9, wherein said detecting means is a temperature sensor.

11. A machine according to claim 9, wherein said limiting means includes a pulse motor valve.

* * * * *